US011677706B1

(12) United States Patent
Chinnalagu et al.

(10) Patent No.: US 11,677,706 B1
(45) Date of Patent: Jun. 13, 2023

(54) SYSTEMS AND METHODS FOR EVALUATING AND DISPLAYING SUBJECT-SPECIFIC COMPLIANCE STANDARD INFORMATION

(71) Applicants: AC Infotech Inc., Santa Clara, CA (US); Matrix Absence Management, Inc., Phoenix, AZ (US)

(72) Inventors: Anandan Chinnalagu, Santa Clara, CA (US); Gordon Smith, Phoenix, AZ (US)

(73) Assignees: MATRIX ABSENCE MANAGEMENT, INC., Phoenix, AZ (US); AC INFOTECH INC., Santa Clara, CA (US)

( * ) Notice: Subject to any disclaimer, the term of this patent is extended or adjusted under 35 U.S.C. 154(b) by 0 days.

(21) Appl. No.: 17/750,177

(22) Filed: May 20, 2022

(51) Int. Cl.
*H04L 51/216* (2022.01)
*G06N 20/00* (2019.01)
*G06F 16/901* (2019.01)
*G06F 40/40* (2020.01)
*G06F 40/205* (2020.01)

(52) U.S. Cl.
CPC ........ *H04L 51/216* (2022.05); *G06F 16/9024* (2019.01); *G06F 40/205* (2020.01); *G06F 40/40* (2020.01); *G06N 20/00* (2019.01)

(58) Field of Classification Search
CPC .... G06F 16/9024; G06F 40/40; G06F 40/205; H04L 51/216; G06N 20/00
See application file for complete search history.

(56) References Cited

U.S. PATENT DOCUMENTS

| | | | | |
|---|---|---|---|---|
| 2018/0324120 | A1* | 11/2018 | Smullen | .................. H04L 67/02 |
| 2019/0073197 | A1* | 3/2019 | Collins | ..................... G06F 8/60 |
| 2019/0268288 | A1* | 8/2019 | Chandra | ................. G06F 9/541 |

* cited by examiner

Primary Examiner — Soe Hlaing

(57) ABSTRACT

Systems and methods for evaluating and displaying subject-specific compliance standard information are provided. A first message is received from a subject. An automated human interface module responsively engages with the subject through a communication channel. The module includes a node graph. Each node in a first subset of nodes is associated with a predetermined compliance question, or in a second subset of nodes is associated with a respective compliance standard. A message received responsive to the automated human interface module progresses the subject in the node graph, and this is process is repeated until the subject progresses to a node in the second subset. The subject, through this progression, satisfies a first requirement to receive a corresponding benefit of a compliance standard associated with the respective node. Responsive to this progression, a report is generated that includes an expected availability of the benefit corresponding to the progressed node.

30 Claims, 21 Drawing Sheets

(402) A method for evaluating and displaying subject-specific compliance standard information. At a computer system comprising one or more processors and a memory. The method is performed for each respective subject in a plurality of subjects, wherein the plurality of subjects comprises more than 100 subjects.

(404) Receiving a respective first message, in electronic form, from the respective subject to engage in a respective text-based conversation through a respective communication channel in a plurality of communication channels, wherein the respective first message comprises a respective first application programming interface token that uniquely identifies the respective text-based conversation.

(406) The plurality of communication channels comprises 10 or more communication channels, 50 or more communication channels, 250 or more communication channels, 2,000 or more communication channels, or 10,000 or more communication channels.

(408) The respective first message comprises an acknowledgement of consent by the respective subject for the automated human interface module to obtain and use personally identifiable information associated with the respective subject.

(410) Responsive to the respective first message, engaging an automated human interface module with the respective subject through the text-based conversation in the respective communication channel, wherein: the automated human interface module comprises a node graph comprising a plurality of nodes, each respective node in the plurality of nodes is connected to at least one other node in the plurality of nodes, each respective node in at least a first subset of the plurality of nodes is associated with at least one predetermined compliance question, and each respective node in at least a second subset of the plurality of nodes is associated with a respective compliance standard in a plurality of compliance standards, the respective compliance standard comprising a corresponding plurality of requirements for compliance with the respective compliance standard.

(412) The compliance standard is specific to a respective government institution or service, a respective entity that employs the respective subject, or both.

(414) The plurality of nodes comprises 50 or more nodes, 100 or more nodes, 500 or more nodes, 1,000 or more nodes, or 5,000 or more nodes.

(416) Each node in the second subset of nodes is associated with at least two nodes in the first subset of nodes.

(418) The node graph is a non-binary node graph.

(420) The automated human interface module comprises an audio and voice response module.

Figure 4A (410 continued)

(422) The predetermined compliance question is configured by an administrator associated with the respective entity that employs the respective subject.

(424) The compliance standard is defined, at least in part, by a federal government entity or service, a state government entity or service, a county government entity or service, a municipal government entity or service, or the respective entity that employs the respective subject.

(426) The predetermined compliance question associated with the respective node comprises an explanation of a corresponding compliance standard associated with the respective node.

(428) Using a message received subsequent to the respective first message in the respective communication channel and responsive to the automated human interface module to progress the respective subject to another node in the node graph in accordance with satisfaction of the predetermined compliance question associated with a first node, wherein the first node is in the first subset of the plurality of nodes.

(430) The using the message further comprises identifying a respective node in the first subset of nodes as an initial node.

(432) The using the message further comprises retrieving information from a prior text-based conversation associated with the respective subject.

(434) The using the message utilizes one or more classification models that receives as input, at least in part, the information provided by the subject in the text-based conversation to identify another node in the node graph and/or to determine if the predetermined compliance question is satisfied.

(436) The one or more classification models comprises a support vector machine classification model, a logistic regression classification model, a naive Bayes classification model, a decision tree classification model, a nearest neighbor classification model, a neural network classification model, or a combination thereof.

(438) The using the message parses a portion of the message in accordance with a corresponding plurality of heuristic instructions associated with a first classification model in the one or more classification models into a respective classification in the form of a corresponding plurality of classification text strings, wherein the corresponding plurality of classification text strings of the respective classification collectively contains a portion, less than all, of the information of the message, and applies a second classification model in the one or more classification models to a respective text string in the corresponding plurality of text strings to determine a characteristic of the respective text string, evaluating the respective text string to progress the respective subject to another node in the node graph in accordance.

(440) The parsing and/or the applying translates the message from a first language to a second language different than the first language.

(442) The message received subsequent the respective first message comprises a name of the respective subject, a proposed absence start date of the respective subject, a proposed absence end date of the respective subject, a reason for a proposed absence of the respective subject, an absence status category of the proposed absence of the respective subject, or a combination thereof.

(444) Prior to receiving the message, determine whether sufficient information has been received by the respective subject in the text-based conversation to determine that the respective subject is deemed to be eligible with the compliance standard, and responsive to determining that sufficient information has not been received, engage the automated human interface module to prompt the respective user to submit further information in accordance with another node in the plurality of nodes.

(446) Prior to receiving the message, load information regarding one or more prior text-based conversations with the respective subject in a respective communication channel in the plurality of communication channels, and use the information regarding the one or more text-based conversations to progress in the node graph.

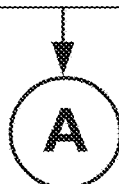

Figure 4C

(448) Repeating the using the message, when the subject remains in a node in the first subset of nodes, until the respective subject progresses to a respective node in the second subset of nodes, wherein the respective subject, through progression to the respective node in the second subset of nodes, is deemed to satisfy at least a subset of a plurality of requirements in the corresponding plurality of requirements of a compliance standard associated with the respective node in the second subset of nodes, wherein the subset of the plurality of requirements comprises at least a first requirement to receive a corresponding benefit from the compliance standard associated with the respective node in the second subset of nodes.

(450) The compliance standard is a performance standard, a maternity leave standard, a short-term disability standard, a longer-term disability standard, a sick leave standard, a fostering or adopting standard, an employer program standard, a surrogacy standard, a parental standard, a pre-natal leave standard, a newborn baby bonding leave standard, a caregiver leave standard, a military service leave standard, a paid time off (PTO) leave standard, a vacation standard, or a combination thereof, and the corresponding benefit of the compliance standard is at least a total number of days the respective subject is entitled to be absent from work within a period of time.

(452) The total number of days is a parallel representation or a series representation for the compliance standard.

(454) Generating, responsive to progression to the respective node in the second subset of nodes, a corresponding report comprising a result of an expected availability of the corresponding benefit for the respective subject in accordance with of the compliance standard associated with the respective node in the second subset of nodes and at least information provided by the subject in the text-based conversation in each instance of the using the message.

(456) The corresponding report comprises a graphical chart comprising: a first axis comprising a first segmentation based on a period of time, a second axis comprising a second segmentation based on a categorization of the compliance standard, and one or more data plots defining at least a total number of days the respective subject is entitled to be absent from work within the period of time.

(458) The corresponding report comprises a graphical chart comprising a first listing portion that provides a description of compensation provided for the respective subject by the compliance standard.

(460) The corresponding report comprises a graphical chart comprising a second listing portion that provides a description of employment protection provided for the respective subject by the compliance standard.

(462) The corresponding report comprises a graphical chart comprising a third listing that provides a log for displaying at least each predetermined compliance question provided in the respective communication channel.

(464) The corresponding report comprises a graphical chart comprising a first section configured to display (i) a timestamp associated with engagement in the respective text-based conversation and/or (ii) an informative notice associated with the result of the expected availability of the corresponding benefit for the respective subject.

(466) The expected availability of the compliance standard for the respective subject is determined based on a period of time that encompasses a contiguous or intermittent present portion and a contiguous or intermittent future portion.

(468) Communicating the corresponding report through the respective communication channel for review by the respective subject.

Figure 4E

Policy Configurations

Federal Policy
State Policy
Employer Policy

Upload Policy Data

State Policy

Add Policy

| State | Policy Code | Policy Name | Administered by | Actions |
|---|---|---|---|---|
| CA | SDI | California State Disability Insurance | State — State-administered, Matrix — Self-funded | |
| CA | PFL | California Paid Family Leave | State — State-administered, Matrix — Self-funded | |
| OR | PFMLA | Oregon Paid Family Leave and Medical Leave Insurance | Self-funded plans — Matrix will administer | |

Policy Configuration

Federal Policy
State Policy
Employer Policy

Employer Policy

| State | Employer Code | Employer Name | Policy Code | Policy Name | Administered By | Action |
|---|---|---|---|---|---|---|
| OR | 319 | Abc, LLC | Parental12W | Personal Parental | Abc, LLC | |
| OR | 319 | Abc, LLC | Ext. 9M | 9M Ext. Leave | Abc, LLC | |
| OR | 319 | Abc, LLC | Ext. 8M | 8M Ext. Leave | Abc, LLC | |
| OR | 319 | Abc, LLC | MLOA6M | 6M Medical Leave | Abc, LLC | |
| OR | 319 | Abc, LLC | Parental12W | Personal Parental | Abc, LLC | |

Bot
To get started, please select which situation you are in.
So you want to understand more about taking time away from work, well, I'm here to help, but I need to ask you some questions.

- Adding to my family
- Dealing with an illness/injury
- Planned medical procedure
- Caring for a family member
- Surrogacy
- Something else

Bot
Exciting!

Bot
How are you expanding your family?

- I'm pregnant
- My partner is pregnant
- I'm adopting
- I'm fostering

Adding to my family — 1010-2

I'm pregnant — 1010-5

What type of birth are you expecting? — 1010-1
- Vaginal birth
- C-section birth Vaginal birth — 1010-2

Bot
What State do you perform most or all of your work? — 1010-3
- California
- Submit California — 1010-3

Bot
Add up all the time you have worked for this employer even if there was a break in work. — 1010-5
- ≥ 1 Year
- < 1 Year More than 1 Year — 1010-6

Bot
Within the last 12 months have you worked at least 1250 hours? — 1010-7
- Yes
- No Yes — 1010-8

*Type or speak your question.* — 1110

Your Pay

| | | |
|---|---|---|
| Week 1 | Unpaid waiting period, use PTO if available to replace your pay — 226-1 | |
| Week 1 - 10 | SDI - State Disability Insurance pays 60% of your salary. If you earn more than $113K then your weekly max is $1300 2022: 1.1% of employee payroll deduction up to cap of $1,601.60/year (taxable income cap $145,600 x .011) — 228-2 | 228-1 |

*Maximum duration of Benefits/Leave: 52 weeks from date of disability. Partial benefit may be paid longer than 52 weeks if employee returns to work during benefit period. Increments of Leave Usage/Benefits: Continuous, Reduced schedule – Must have a wage loss due to being unable to perform regular or customary work for at least 8 consecutive days.

| Week 11 - 18 | PFL - Paid Family Leave pays 60% of your salary then top up with PTO |
|---|---|

*Leave/Benefits Year: 12-month period from first day of leave. Increments of Leave Usage/Benefits: Continuous, Intermittent. Maximum Duration of Benefits/Leave: 8 weeks.

| Week 19 - 29 | Use PTO if available to replace your pay |
|---|---|

*Your employer will process any payments for leave benefits.

Job Protection — 1210-4

| Week 1 - 12 | FMLA - Family Medical Leave Act up to 12 weeks of job protected leave. |
|---|---|
| Week 1 - 17 | PDL - Pregnancy Disability Leave, PreDelivery and Recovery. Runs concurrently with FMLA. |

*Employee can elect or employer can require use of accrued sick leave. Employee can elect to use accrued vacation or other paid time off.

| Week 18 - 29 | CFRA - California Family Rights Act - 12 weeks job protected to bond with your baby, must be taken within the first year. |
|---|---|

*Leave Increments for Parental/Bonding Leave: continuous, Intermittent in blocks of two weeks or more; plus up to 2 occasions of less than 2 weeks. Employee can elect or employer can require use of accrued paid time off during leave.

Figure 15

| Question we asked | Your answer |
|---|---|
| To get started, please select which situation you are in | Adding to my family |
| How are you expanding your family? | I'm pregnant |
| What type of birth are you expecting? | Vaginal birth |
| In what State are you located when you performed most or all of your work? | California |
| Add up all the time you have worked for this employer even if there was a break in work. | More than 1 Year |
| By the time you start your leave, will you have worked at least 1250 hours for your employer? | Yes |
| What is your baby's due date? | July 9, 2022 |
| Are you planning to take any time off prior to your delivery? | 4 |
| Do you have any paid time off (PTO) saved up? | Yes |

Figure 16

SYSTEMS AND METHODS FOR EVALUATING AND DISPLAYING SUBJECT-SPECIFIC COMPLIANCE STANDARD INFORMATION

TECHNICAL FIELD

The present disclosure is directed to systems and methods for evaluating and displaying subject-specific compliance standard information.

BACKGROUND

Due to complexities that are directly or indirectly managed by a company, human resource ("HR") management has become a challenge to implement at an employee specific level. For instance, as a company grows, managing employee benefits in an effective and risk-free manner, such as a State leave program, becomes increasingly difficult—particularly when the company grows across multiple jurisdictions. Thus, managing the individualized needs of each employee is challenging in the face of the regulatory rules imposed on the company by governments or collective bargaining agreements, which often change over time.

One conventional solution to this employee management issue is to utilize messaging platforms to engage with employees in conversation. However, such messaging platforms conventionally require service personnel to engage with the employees and thus are costly to train in complex detailed trainings and do not resolve all the employee management issues in a satisfactory manner. Accordingly, work has gone into developing messaging platforms that provide automated "bots" to simulate conversations with the employees. This allows the employees to communicate with the bots through messaging platforms. Typically, such bots provide a conversational experience by allowing a natural conversation between the bots and employees, for instance by having the bots learn a fixed set of keywords or commands and appropriate responses to these keywords or commands. However, conversations within the employee management environment often include sensitive information, such as personally identifiable information of the employee. Because of this and other factors, conventional solutions that make use of bots have, to date, failed to satisfactorily address employee management issues.

Furthermore, in many cases, determining how to respond properly to each employee in an individualized manner is a challenging task in part due to the subtleties and ambiguity of natural languages, as well as limitations in bot learning for the specific issues the employee wishes to resolve within an employee management environment. Accordingly, conventional solutions fail to analyze a communication with an employee to determine a true characteristic of the conversation in a satisfactory manner in many instances.

Given the above-background, what is needed in the art are improved systems, methods, and apparatuses for facilitating spatial resolved temporal networks.

SUMMARY

The present disclosure addresses the shortcomings disclosed above by providing systems and methods for evaluating and displaying subject-specific compliance standard information. More particularly, the systems and methods of the present disclosure provide assistance to a respective subject by obtaining information pertaining to the respective subject, evaluating the obtained information, and displaying a result of the evaluation of the obtained information for review by the respective subject. The assistance and obtaining of information is facilitated through a conversation between the respective subject and an automated human interface module that is configured to conversationally engage with the respective subject. The automated human interface module conversationally engages the respective subject by communicating a message that includes a predetermined compliance question configured to elicit a response from the respective subject. Responsive to this, the automated human interface module evaluates whether the message from the respective subject satisfies a respective requirement in a corresponding plurality of requirements associated with a relevant compliance standard. This conversational engagement drives progression in a node graph of the automated human interface. When the automated human interface module determines that the subject satisfies at least a subset of the requirements in order to receive a corresponding benefit of the relevant compliance standard, the systems and methods of the present disclosure generate a corresponding report for review by the respective subject. From this, the systems and methods of the present disclosure allow for displaying subject-specific information related to the compliance standard conveniently through the corresponding report.

One aspect of the present disclosure is directed to providing a computer system. The computer system includes one or more processing units and a memory coupled to at least one processing unit of the one or more processing units. The memory stores at least one program for execution by the at least one processing unit. The at least one program includes one or more instructions. For each respective subject in a plurality of subjects, in which the plurality of subjects includes more than 50, 100, 150, 200, or 250 subjects, the at least one program includes one or more instructions to receive a respective first message, in electronic form, from the respective subject to engage in a respective text-based conversation through a respective communication channel in a plurality of communication channels. The respective first message includes a respective first application programming interface token that uniquely identifies the respective text-based conversation. The at least one program includes one or more instructions that, responsive to the respective first message, engages an automated human interface module with the respective subject through the text-based conversation in the respective communication channel. The automated human interface module includes a node graph which includes a plurality of nodes. Each respective node in the plurality of nodes is connected to at least one other node in the plurality of nodes. Furthermore, each respective node in at least a first subset of the plurality of nodes is associated with at least one predetermined compliance question. Moreover, each respective node in at least a second subset of the plurality of nodes is associated with a respective compliance standard in a plurality of compliance standards. The respective compliance standard includes a corresponding plurality of requirements for compliance with the respective compliance standard. Further still, the at least one program includes one or more instructions that uses a message received subsequent to the respective first message in the respective communication channel and responsive to the automated human interface module to progress the respective subject to another node in the node graph in accordance with satisfaction of the predetermined compliance question associated with a first node.

Furthermore, the first node is in the first subset of the plurality of nodes. Additionally, the at least one program includes one or more instructions that continue to query the subject for additional compliance information when the subject remains at one of the nodes in the first subset of nodes, until the respective subject progresses to a respective node in the second subset of nodes. Accordingly, the respective subject, through the ultimate progression to the respective node in the second subset of nodes, is deemed to satisfy at least a subset of a plurality of requirements in the corresponding plurality of requirements of a compliance standard associated with the respective node in the second subset of nodes.

Furthermore, the subset of the plurality of requirements includes at least a first requirement to receive a corresponding benefit from the compliance standard associated with the respective node in the second subset of nodes.

The at least one program also includes, in some embodiments, one or more instructions that generates, responsive to progression to the respective node in the second subset of nodes, a corresponding report including a result of an expected availability of the corresponding benefit for the respective subject in accordance with the compliance standard associated with the respective node in the second subset of nodes and at least information provided by the subject in the text-based conversation leading up to arrival of this node. Moreover, in such embodiments, the at least one program includes one or more instructions that communicates the corresponding report through the respective communication channel for review by the respective subject.

In some embodiments, the compliance standard is specific to a respective government institution or service, a respective entity that employs the respective subject, or both.

In some embodiments, the plurality of communication channels includes 10 or more communication channels, 50 or more communication channels, 250 or more communication channels, 2,000 or more communication channels, or 10,000 or more communication channels. In some embodiments, rather than a plurality of communication channels, the present disclosure makes use of a single communication channel. In some embodiments each communication channel is a logical channel associated with a unique identifier, while in other embodiments each communication channel is a separate physical channel.

In some embodiments, the plurality of nodes includes 3 or more nodes, 5 or more nodes, 10 or more nodes, 25 or more 50 or more nodes, 100 or more nodes, 500 or more nodes, 1,000 or more nodes, or 5,000 or more nodes.

In some embodiments, each node in the second subset of nodes is associated with at least two nodes in the first subset of nodes. That is, for example, two or more nodes in the first subset of nodes can serve as the gateway to a single common node in the second subset of nodes.

In some embodiments, the node graph is a non-binary node graph.

In some embodiments, the using the message received subsequent to the respective first message further includes identifying a respective node in the first subset of nodes as an initial node.

In some embodiments, the using the message received subsequent to the respective first message further includes retrieving information from a prior text-based conversation associated with the respective subject. This allows for the subject to drop off a conversation when they run out of time and to pick up where left off in the last conversation.

In some embodiments, the automated human interface module includes an audio and voice response module.

In some embodiments, the using the message received subsequent to the respective first message utilizes one or more models that receives as input, at least in part, the information provided by the subject in the text-based conversation to identify another node in the node graph and/or to determine if the predetermined compliance question is satisfied.

In some embodiments, the one or more models includes a support vector machine model, a logistic regression model, a naive Bayes model, a decision tree model, a nearest neighbor model, a neural network model, or a combination thereof.

In some embodiments, the using the message received subsequent to the respective first message parses a portion of the message in accordance with a corresponding plurality of heuristic instructions associated with a first model in the one or more models into a respective classification in the form of a corresponding plurality of classification text strings. The corresponding plurality of classification text strings of the respective classification collectively contains a portion, less than all, of the information of the message. Further, the using the message applies a second model in the one or more models to a respective text string in the corresponding plurality of text strings to determine a characteristic of the respective text string, evaluating the respective text string to progress the respective subject to another node in the node graph in accordance.

In some embodiments, the parsing and/or the applying translates the message from a first language to a second language different than the first language.

In some embodiments, the predetermined compliance question is configured by an administrator associated with the respective entity that employs the respective subject.

In some embodiments, the message received subsequent the respective first message includes a name of the respective subject, a proposed absence start date of the respective subject, a proposed absence end date of the respective subject, a reason for a proposed absence of the respective subject, an absence status category of the proposed absence of the respective subject, or a combination thereof.

In some embodiments, the compliance standard is defined, at least in part, by a federal government entity or service, a state government entity or service, a county government entity or service, a municipal government entity or service, or the respective entity that employs the respective subject.

In some embodiments, the compliance standard is a performance standard, a maternity leave standard, a short-term disability standard, a longer-term disability standard, a sick leave standard, a fostering or adopting standard, an employer program standard, a surrogacy standard, a parental standard, a pre-natal leave standard, a newborn baby bonding leave standard, a caregiver leave standard, a military service leave standard, a paid time off (PTO) leave standard, a vacation standard, or a combination thereof. Furthermore, the corresponding benefit of the compliance standard is at least a total number of days the respective subject is entitled to be absent from work within a period of time.

In some embodiments, the corresponding report includes a graphical chart. The graphical chart includes a first axis including a first segmentation based on a period of time. Moreover, the graphical chart includes a second axis including a second segmentation based on a categorization of the compliance standard. Furthermore, the graphical chart includes one or more data plots defining at least a total number of days the respective subject is entitled to be absent from work within the period of time.

In some embodiments, the total number of days is a parallel representation or a series representation for the compliance standard.

In some embodiments, the graphical chart includes a first listing portion that provides a description of compensation provided for the respective subject by the compliance standard.

In some embodiments, the graphical chart includes a second listing portion that provides a description of employment protection provided for the respective subject by the compliance standard.

In some embodiments, the graphical chart includes a third listing that provides a log for displaying at least each predetermined compliance question provided in the respective communication channel.

In some embodiments, the graphical chart includes a first section configured to display a timestamp associated with engagement in the respective text-based conversation and/or an informative notice associated with the result of the expected availability of the corresponding benefit for the respective subject.

In some embodiments, the expected availability of the compliance standard for the respective subject is determined based on a period of time that encompasses a contiguous or intermittent present portion and a contiguous or intermittent future portion.

In some embodiments, the respective first message includes an acknowledgement of consent by the respective subject for the automated human interface module to obtain and use personally identifiable information associated with the respective subject.

In some embodiments, the predetermined compliance question associated with the respective node includes an explanation of a corresponding compliance standard associated with the respective node.

In some embodiments, the at least one program further includes one or more instructions that, prior to receiving the message subsequent the respective first message, determine whether sufficient information has been received by the respective subject in the text-based conversation to determine that the respective subject is deemed to be eligible with the compliance standard. Responsive to determining that sufficient information has not been received, the at least one program further includes one or more instructions that engage the automated human interface module to prompt the respective subject to submit further information in accordance with another node in the plurality of nodes.

In some embodiments, the at least one program further includes one or more instructions that, prior to receiving the second message, load information regarding one or more prior text-based conversations with the respective subject in a respective communication channel in the plurality of communication channels. Moreover, the at least one program includes one or more instructions that use the information regarding the one or more text-based conversations to progress in the node graph.

Another aspect of the present disclosure is directed to providing a non-transitory computer readable storage medium. The non-transitory computer readable storage medium stores instructions, which when executed by a computer system, cause the computer system to perform a method for each respective subject in a plurality of subjects. The plurality of subjects includes more than 100 subjects. The method includes receiving a respective first message, in electronic form, from the respective subject to engage in a respective text-based conversation through a respective communication channel in a plurality of communication channels. The respective first message includes a respective first application programming interface token that uniquely identifies the respective text-based conversation. The method includes, responsive to the respective first message, engaging an automated human interface module with the respective subject through the text-based conversation in the respective communication channel. The automated human interface module includes a node graph, which includes a plurality of nodes. Each respective node in the plurality of nodes is connected to at least one other node in the plurality of nodes. Furthermore, each respective node in at least a first subset of the plurality of nodes is associated with at least one predetermined compliance question. Moreover, each respective node in at least a second subset of the plurality of nodes is associated with a respective compliance standard in a plurality of compliance standards. The respective compliance standard includes a corresponding plurality of requirements for compliance with the respective compliance standard. Moreover, the method includes using a message received subsequent to the respective first message in the respective communication channel and responsive to the automated human interface module to progress the respective subject to another node in the node graph in accordance with satisfaction of the predetermined compliance question associated with a first node. Furthermore, the first node is in the first subset of the plurality of nodes. Additionally, the method includes repeating the using the message received subsequent to the respective first message, when the subject remains in a node in the first subset of nodes, until the respective subject progresses to a respective node in the second subset of nodes. Accordingly, the respective subject, through progression to the respective node in the second subset of nodes, is deemed to satisfy at least a subset of a plurality of requirements in the corresponding plurality of requirements of a compliance standard associated with the respective node in the second subset of nodes. Furthermore, the subset of the plurality of requirements includes at least a first requirement to receive a corresponding benefit from the compliance standard associated with the respective node in the second subset of nodes. The method includes generating, responsive to progression to the respective node in the second subset of nodes, a corresponding report including a result of an expected availability of the corresponding benefit for the respective subject in accordance with the compliance standard associated with the respective node in the second subset of nodes and at least information provided by the subject in the text-based conversation in each instance of the using the message received subsequent to the respective first message. Moreover, the method includes communicating the corresponding report through the respective communication channel for review by the respective subject.

Yet another aspect of the present disclosure is directed to providing a method. The method is performed at a server system that includes one or more processors and memory. The method includes receiving a respective first message, in electronic form, from the respective subject to engage in a respective text-based conversation through a respective communication channel in a plurality of communication channels. The respective first message includes a respective first application programming interface token that uniquely identifies the respective text-based conversation. The method includes, responsive to the respective first message, engaging an automated human interface module with the respective subject through the text-based conversation in the respective communication channel. The automated human interface module includes a node graph, which includes a plurality of nodes. Each respective node in the plurality of nodes is connected to at least one other node in the plurality of nodes. Furthermore, each respective node in at least a first subset of the plurality of nodes is associated with at least one predetermined compliance question. Moreover, each respective node in at least a second subset of the plurality of nodes is associated with a respective compliance standard in a plurality of compliance standards. The respective compliance standard includes a corresponding plurality of requirements for compliance with the respective compliance standard. Moreover, the method includes using a message received subsequent to the respective first message in the respective communication channel and responsive to the automated human interface module to progress the respective subject to another node in the node graph in accordance with satisfaction of the predetermined compliance question associated with a first node. Furthermore, the first node is in the first subset of the plurality of nodes. Additionally, the method includes repeating the using the message received subsequent to the respective first message, when the subject remains in a node in the first subset of nodes, until the respective subject progresses to a respective node in the second subset of nodes. Accordingly, the respective subject, through progression to the respective node in the second subset of nodes, is deemed to satisfy at least a subset of a plurality of requirements in the corresponding plurality of requirements of a compliance standard associated with the respective node in the second subset of nodes. Furthermore, the subset of the plurality of requirements includes at least a first requirement to receive a corresponding benefit from the compliance standard associated with the respective node in the second subset of nodes. The method includes generating, responsive to progression to the respective node in the second subset of nodes, a corresponding report including a result of an expected availability of the corresponding benefit for the respective subject in accordance with the compliance standard associated with the respective node in the second subset of nodes and at least information provided by the subject in the text-based conversation in each instance of the using the message received subsequent to the respective first message. Moreover, the method includes communicating the corresponding report through the respective communication channel for review by the respective subject.

BRIEF DESCRIPTION OF THE DRAWINGS

FIGS. 4A, 4B, 4C, 4D, and 4E collectively illustrate a method for evaluating and displaying subject-specific compliance standard information, in which dashed boxes indicated optional features, in accordance with some embodiments of the present disclosure;

FIG. 5 illustrates a user interface of a display of a client device that allows an end-user to configure a respective compliance standard associated with a State government entity or service, in accordance with an exemplary embodiment of the present disclosure;

FIG. 6 illustrates a user interface of a display of a client device that allows an end-user to configure a respective compliance standard associated with an employer of a respective subject, in accordance with an exemplary embodiment of the present disclosure;

FIG. 7 illustrates a user interface of a display of a client device that allows an end-user to configure a predetermined compliance question associated with a respective compliance policy, in accordance with an exemplary embodiment of the present disclosure;

Figure 9:
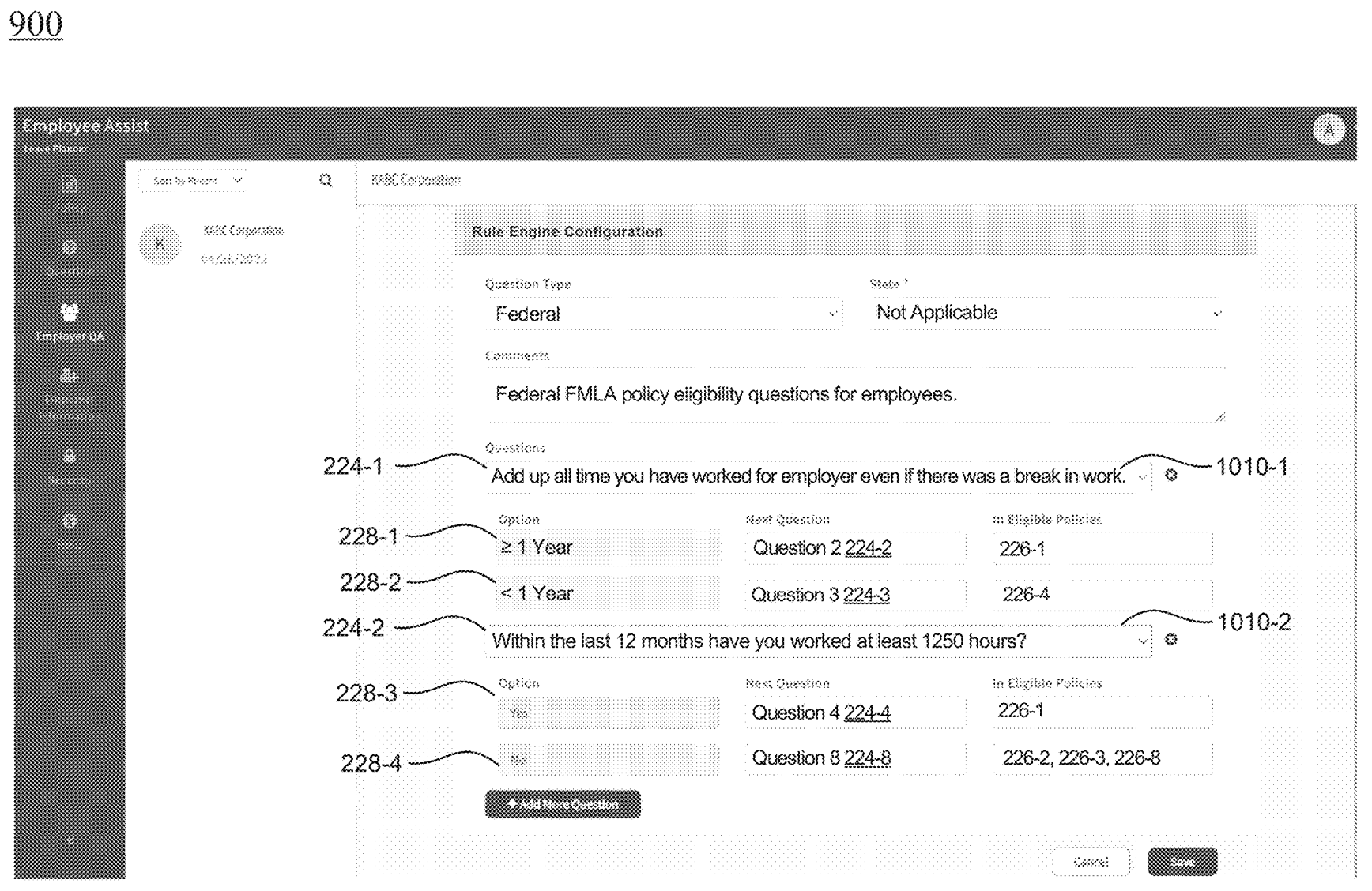

FIG. 9 illustrates another user interface of a display of a client device that allows an end-user to configure a node graph of an automated human interaction module, in accordance with an exemplary embodiment of the present disclosure;

FIG. 10 illustrates a user interface of a display of a client device that allows an end-user to engage with a text-based conversation through a respective communication channel;

FIG. 11 illustrates another user interface of a display of a client device that allows an end-user to engage with a text-based conversation through a respective communication channel;

FIG. 15 illustrates a user interface of a display of a client device that allows an end-user to review a corresponding report including a first listing and a second listing, in accordance with an exemplary embodiment of the present disclosure; and FIG. 16 illustrates a user interface of a display of a client device that allows an end-user to review a corresponding report including a third listing, in accordance with an exemplary embodiment of the present disclosure.

Figure 1:
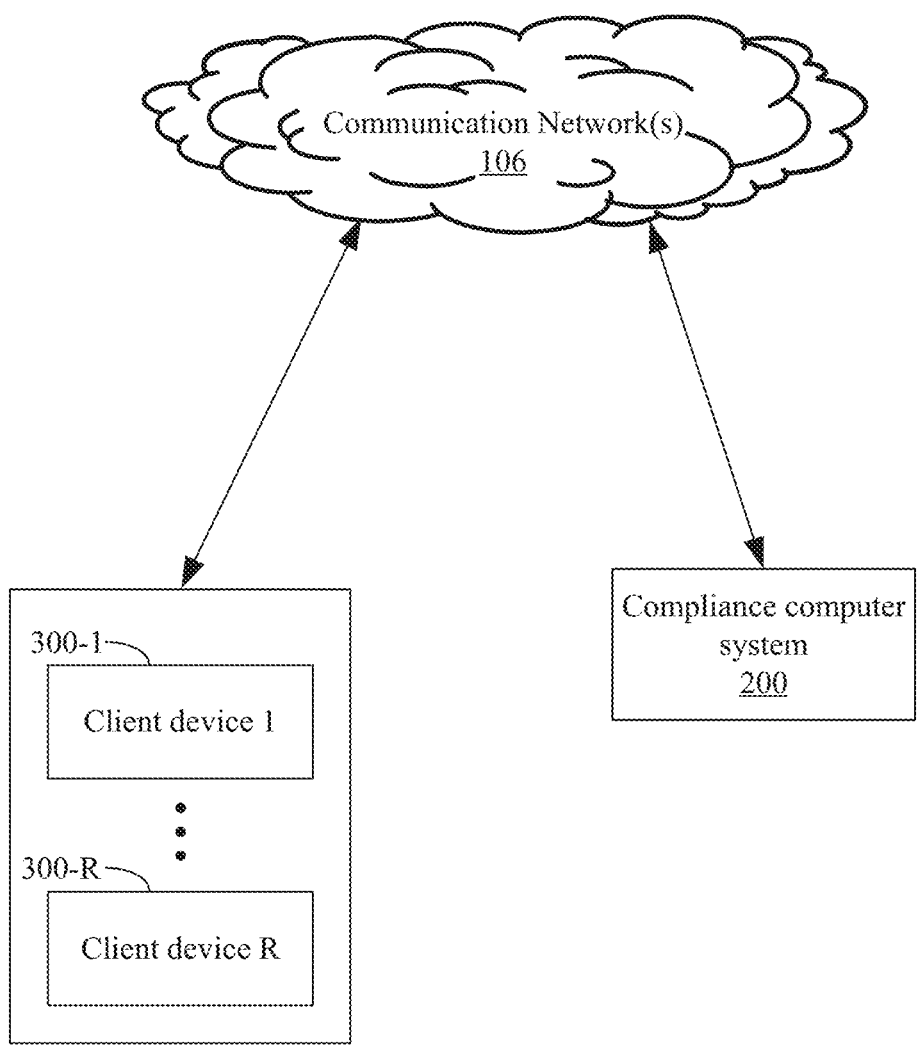
FIG. 1 illustrates a distributed system topology for evaluating and/or displaying subject-specific compliance standard information including a compliance computer system and a population of client devices, in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present disclosure is directed to systems and methods that evaluate a respective subject and/or displaying subject-specific compliance standard information, such as information for a compliance standard policy. Accordingly, the systems and methods of the present disclosure receive a first message from a subject. Typically, the subject is an employee of an employer entity. In some such embodiments, the first message includes a request for information specific to the subject and/or the employer of the subject. The systems and methods of the present disclosure allow for an automated human interface module to responsively engage with the subject through a communication channel, which is utilized to facilitate a conversation between the subject and the automated human interface module. The automated human interface module includes a node graph, which includes a plurality of nodes interconnected to form a hierarchical data structure utilized to progress the subject through content logic made available to the automated human interface module. Each respective node in a first subset of nodes in the node graph is associated with a predetermined compliance question, which is utilized to form a decision by the automated human interface module as to which node in the node graph to position the subject. Moreover, each respective node in a second subset of nodes in the node graph is associated with a respective compliance standard.

The systems and methods of the present disclosure allow for using messages received from the subject, received responsive to queries provided the automated human interface module, to progress the subject in the node graph. Such a progression, for example, advances the subject from a first node to a second node in the first subset of nodes. To facilitate such progression, the automated human interface module engages the respective subject in the communication channel by providing a predetermined compliance question associated with the first node in order to prompt receiving the message from the subject that allows for progression to the second node. In some embodiments, the systems and methods of the present disclosure repeat this process of eliciting a compliance question based on the subject's current node position and using the subject's response to advance the subject to another node in the node graph. In some embodiments this process is repeated until the respective subject progresses in the node graph from the first subset of nodes in the node graph to any node in the second subset of nodes in the node graph. The identity of this particular node in the second subset will depend on the compliance question answers the subject gave in the steps leading up to arrival of the node in the second subset of nodes.

In a non-limiting example, in some embodiments, each respective node in the second subject of nodes is a leaf node (e.g., a node in the plurality of nodes lacking a subsequent child node) of the node graph, and acts, at least in part, as an end point to an instance through the content logic made available to the automated human interface module. Accordingly, the repeating ends when the respective subject, through the above-described progression, satisfies a first requirement to receive a corresponding benefit of a compliance standard associated with the respective node in the second subject of nodes.

In some embodiments, a corresponding report is generated for review by the respective subject. The corresponding report includes a result of an expected availability of the corresponding benefit, which allows for the respective subject to visualize the result through the corresponding report. In some embodiments, the systems and methods of the present disclosure communicate the corresponding report through the communication channel for review by the respective subject. Accordingly, by generating the respective report and communicating the corresponding report through the communication channel, the systems and methods of the present disclosure allow for displaying subject-specific information related to the compliance standard conveniently. In some embodiments, no report is generated and the relevant information is communicated by to the respective subject by other means, such as by telephone, through a human resource officer, or by mail.

As used herein, a "compliance standard" is a right conferred by an existing law, regulation, or policy to ensure a subject gets a protected right in the form of a corresponding benefit of the compliance standard. In some embodiments, the corresponding benefit is a generic right to leave, a right to reinstatement, a right to pay, a right to continuation of health insurance, a right of job protection, a right against retaliation, or a right against interference. In some embodiments, the right to leave is a right to be absent from work under specific conditions, which are realized as a corresponding plurality of requirements of the compliance standard. Additional details and information regarding a compliance standard and a corresponding benefit of the compliance standard can be found at Williamson, 2019, "The Meaning of Leave: Understanding Workplace Leave Rights," NYUJ Legis. & Pub. Pol'y, 22, pg. 197, which is hereby incorporated by reference in its entirety.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description includes example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations.

However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

Furthermore, as used herein, the term "dynamically" means an ability to update a program while the program is currently running.

Additionally, the terms "client," "subject," and "user" are used interchangeably herein unless expressly stated otherwise.

Moreover, as used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: $n \geq 2$; $n \geq 5$; $n \geq 10$; $n \geq 25$; $n \geq 40$; $n \geq 50$; $n \geq 75$; $n \geq 100$; $n \geq 125$; $n \geq 150$; $n \geq 200$; $n \geq 225$; $n \geq 250$; $n \geq 350$; $n \geq 500$; $n \geq 600$; $n \geq 750$; $n \geq 1,000$; $n \geq 2,000$; $n \geq 4,000$; $n \geq 5,000$; $n \geq 7,500$; $n \geq 10,000$; $n \geq 20,000$; $n \geq 40,000$; $n \geq 75,000$; $n \geq 100,000$; $n \geq 200,000$; $n \geq 500,000$, $n \geq 1 \times 10^6$, $n \geq 5 \times 10^6$, or $n \geq 1 \times 10^7$. As such, the algorithms, models, regressors, and/or classifiers of the present disclosure cannot be mentally performed. In some embodiments, n is between 10,000 and $1 \times 10^7$, between 100,000 and $5 \times 10^6$, or between 500,000 and $1 \times 10^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

Furthermore, when a reference number is given an "$i^{th}$" denotation, the reference number refers to a generic component, set, or embodiment. For instance, a requirement termed "requirement i" refers to the $i^{th}$ requirement in a plurality of requirements (e.g., a requirement 228-*i* in a plurality of requirements 228).

In the present disclosure, unless expressly stated otherwise, descriptions of devices and systems will include implementations of one or more computers. For instance, and for purposes of illustration in FIG. 1, a compliance computer system 200 is represented as single device that includes all the functionality of the compliance computer system 200. However, the present disclosure is not limited thereto. For instance, in some embodiments, the functionality of the compliance computer system 200 is spread across any number of networked computers and/or reside on each of several networked computers and/or by hosted on one or more virtual machines and/or containers at a remote location accessible across a communication network (e.g., communication network 106 of FIG. 1). One of skill in the art will appreciate that a wide array of different computer topologies is possible for the compliance computer system 200, and other devices and systems of the preset disclosure, and that all such topologies are within the scope of the present disclosure. Moreover, rather than relying on a physical communication network 106, the illustrated devices and systems may wirelessly transmit information between each other. As such, the exemplary topology shown in FIG. 1 merely serves to describe the features of an embodiment of the present disclosure in a manner that will be readily understood to one of skill in the art.

FIG. 1 illustrates an exemplary topography of an integrated system 100 for providing an evaluation of a respective subject and/or displaying subject-specific information for the respective subject based on an evaluation of the respective subject. The integrated system 100 includes a compliance computer system 200 that receives a communication for analysis, and one or more client devices 300 (e.g., computing devices) that provide and/or receive communications to and/or from the compliance computer system 200. In some embodiments, each client device 300 is associated with at least one subject (e.g., a first client device 300-1 is associated with a first subject, a second client device 300-2 is associated with a second subject, etc.). However, the present disclosure is not limited thereto.

Figure 2A:
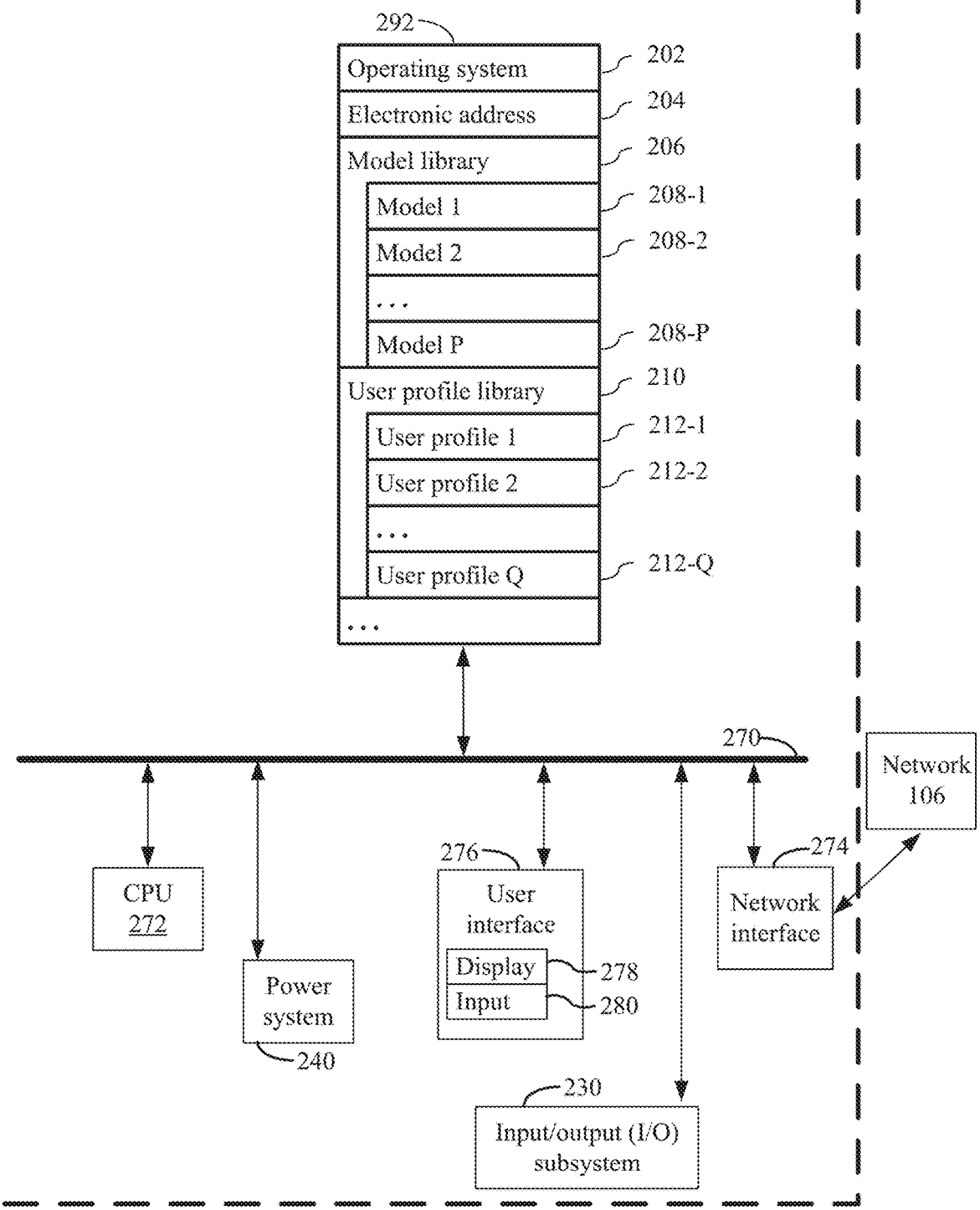
FIGS. 2A and 2B collectively illustrate a compliance computer system, in accordance with an exemplary embodiment of the present disclosure.
Figure 2B:
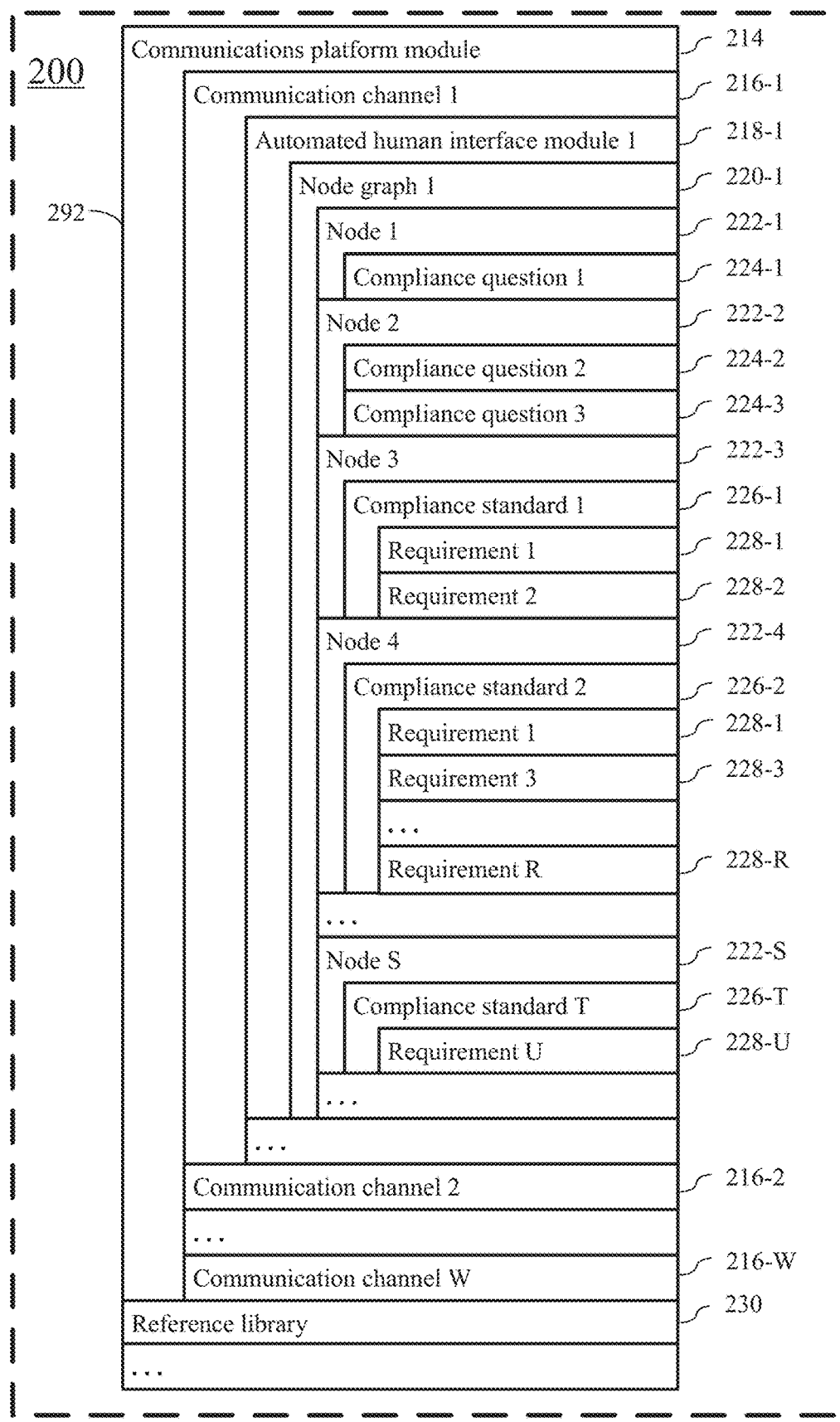
Figure 3:
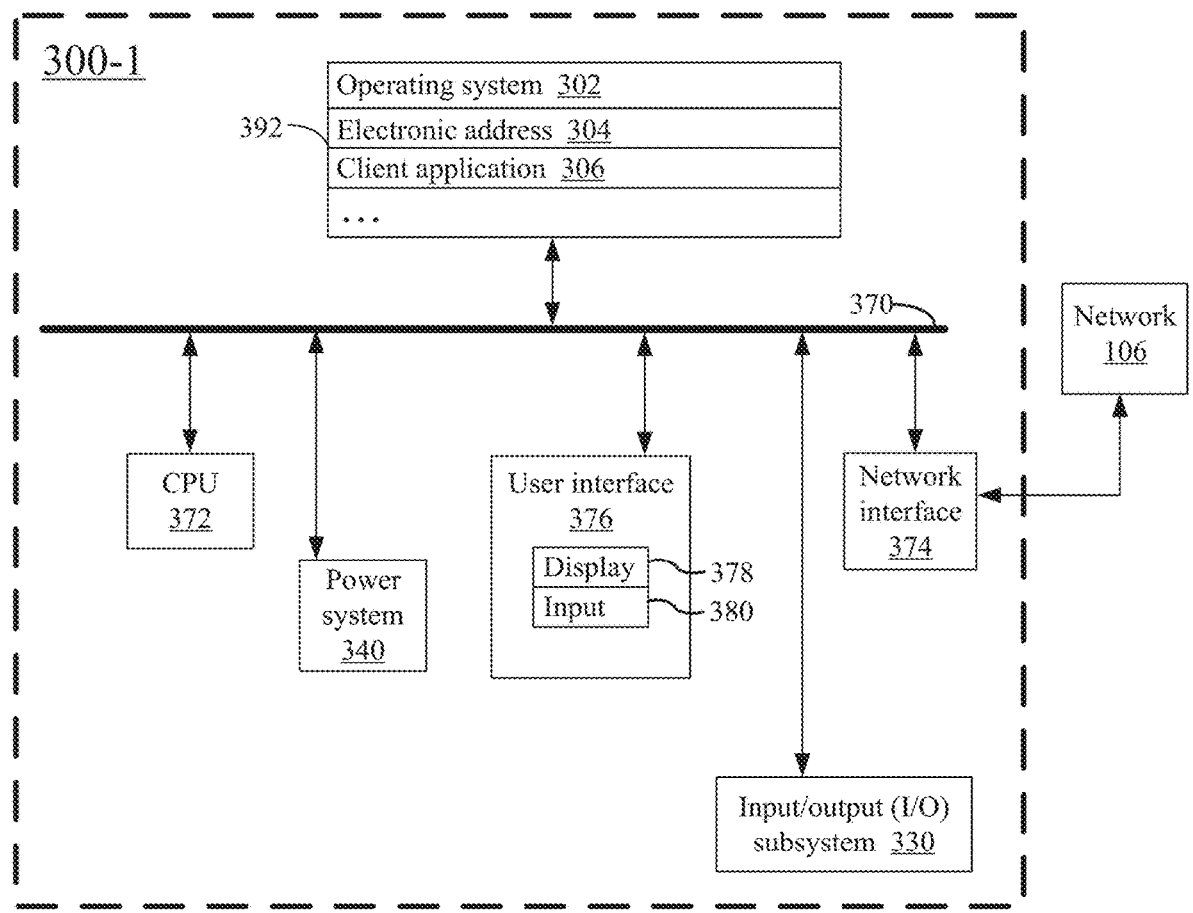
FIG. 3 illustrates a client device, in accordance with an exemplary embodiment of the present disclosure.

A detailed description of a system 100 for providing an evaluation of a respective subject and/or displaying subject-specification information for the respective subject based on the evaluation of the respective subject in accordance with the present disclosure is described in conjunction with FIG. 1 through FIG. 3. As such, FIG. 1 through FIG. 3 collectively illustrate an exemplary topology of the system 100 in accordance with the present disclosure. In the topology, there is a compliance computer system 200 (e.g., compliance computer system 200 of FIGS. 2A and 2B) that provides services to a plurality of subjects through a communications platform module (e.g., communications platform module 214 of FIG. 2B), and a population of client devices 300 (e.g., client device 300 of FIG. 3) associated with the plurality of subjects that interact with the compliance computer system 200.

Referring to FIG. 1, the compliance computer system 200 is configured to evaluate information received by a respective subject associated with a corresponding client device 300 and/or facilitate displaying subject-specific compliance standard information for review by the respective subject (e.g., block 460 of FIG. 4E). In evaluating the information received by the respective subject, the compliance computer system 200 receives a message (e.g., message 1010-2 of FIG. 10, message 1010-5 of FIG. 10, message 1010-2 of FIG. 11, message 1010-3 of FIG. 11, message 1010-6 of FIG. 11, message 1010-8 of FIG. 11, message 1010-1 of FIG. 16, message 1010-2 of FIG. 16, message 1010-3 of FIG. 16, message 1010-4 of FIG. 16, message 1010-7 of FIG. 16, message 1010-8 of FIG. 16, message 1010-9 of FIG. 16, etc.) from a client device 300 associated with a respective subject and/or one or more remote servers. The message is provided in electronic form to the compliance computer system 200. Each message includes, or forms, a data construct which is the basis of the evaluation provided by the compliance computer system. In some embodiments, a communication includes information identifying a source of the message (e.g., a first message 1010-1 includes information, such as electronic address 304, identifying a first client device 300-1 of FIG. 3 as a source of the first message, etc.).

Of course, other topologies of the system 100 other than the one depicted in FIG. 1 are possible. For instance, in some embodiments rather than relying on a communication network 106, the one or more client devices 300 wirelessly transmit information (e.g., messages) directly to the compliance computer system 200. Further, in some embodiments, compliance computer system 200 and/or the client device 300 constitute a portable electronic device, a server computer, or in fact constitute several computers that are linked together in a network, or is a virtual machine and/or a container in a cloud-computing context. As such, the exemplary topology shown in FIG. 1 merely serves to describe the features of an embodiment of the present disclosure in a manner that will be readily understood to one of skill in the art.

Turning to FIGS. 2A and 2B with the foregoing in mind, in some embodiments the compliance computer system 200 includes one or more computers. For purposes of illustration in FIGS. 2A and 2B, the compliance computer system 200 is represented as a single computer that includes all of the functionality for providing a characteristic analysis system. However, the present disclosure is not limited thereto. In some embodiments, the functionality for providing a compliance computer system 200 is spread across any number of networked computers, and/or resides on each of several networked computers, and/or is hosted on one or more virtual machines and/or one or more containers at a remote location accessible across the communication network 106. One of skill in the art will appreciate that any of a wide array of different computer topologies are used for the application and all such topologies are within the scope of the present disclosure.

In some embodiments, the compliance computer system 200 receives a message utilizing the communication network 106 wirelessly through radio-frequency (RF) signals. In some embodiments, such signals are in accordance with an 802.11 (Wi-Fi), Bluetooth, or ZigBee standard.

In some embodiments, the compliance computer system 200 receives a message directly from a source (e.g., directly from a client device 300 associated with a respective subject that provided the context of the information within the message). In some embodiments, the compliance computer system 200 receives the message from an auxiliary server (e.g., from a remote application host server). In such embodiments, the auxiliary server is in communication with the client device 300 and receives one or more message from the client device 300. Accordingly, the auxiliary server provides the message to the compliance computer system 200. In some embodiments, the auxiliary server provides (e.g., polls for) one or more messages on a recurring basis (e.g., each minute, each hour, each day, or a non-period basis as specified by the auxiliary server and/or a subject, etc.).

In some embodiments, the compliance computer system 200 is not proximate to the subject and/or does not have wireless capabilities or such wireless capabilities are not used for the purpose of acquiring a communication. In such embodiments, a communication network 106 is utilized to communicate a message from a source (e.g., client device 300) to the compliance computer system 200.

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

The compliance computer system 200 includes one or more processing units (CPU's) 272, a network or other communications interface 274, a memory 292 (e.g., random access memory), one or more magnetic disk storage and or persistent devices optionally accessed by one or more controllers, one or more communication busses 270 for interconnecting the aforementioned components, a user interface 276, the user interface 276 including a display 278 and input 280 (e.g., keyboard, keypad, touch screen), and a power system 240 (e.g., power supply) for powering the aforementioned components. In some embodiments, data in memory 292 is seamlessly shared with non-volatile memory using known computing techniques such as caching. In some embodiments, memory 292 includes mass storage that is remotely located with respect to the central processing unit(s) 272. In other words, some data stored in memory 292 may in fact be hosted on computers that are external to the compliance computer system 200 but that can be electronically accessed by the compliance computer system 200 over an Internet, intranet, or other form of network or electronic cable (illustrated as element 106 in FIG. 2) using network interface 274.

In some embodiments, the memory 292 of the compliance computer system 200 stores:
- an operating system 202 (e.g., ANDROID, iOS, DARWIN, RTXC, LINUX, UNIX, OS X, WINDOWS, or an embedded operating system such as VxWorks) that includes procedures for handling various basic system services;
- an electronic address 204 associated with the compliance computer system 200 that identifies the compliance computer system 200 (e.g., within the communication network 106);
- a model library 206 that stores one or more models 208, such as for evaluating a message provided by a respective subject and/or generating a corresponding report for the respective subject;
- a user profile library 210 that stores a user profile 212 for each subject in a plurality of subjects;
- a communications platform module 214 for supporting secure communication channels 216 between an automated human interface module 218 of the compliance computer system 200 and a respective subject associated with a client device 300; and
- a reference library 230 that stores information obtained from one or more remote sources.

As illustrated in FIG. 2A, the compliance computer system preferably includes an operating system 202 that includes procedures for handling various basic system services. The operating system 202 includes various software components and or drivers for controlling and managing general system tasks (e.g., memory management, storage device control, power management, etc.) and facilitates communication between various hardware and software components.

An electronic address 204 is associated with the compliance computer system 200, which is utilized to at least uniquely identify the compliance computer system 200 from other devices and components of the system 100. In some embodiments, the compliance computer system 200 includes a serial number, and optionally, a model number or manufacturer information that further identifies the compliance computer system 200. In some embodiments, the electronic address 204 associated with the compliance computer system 200 is used to provide a source of a message received from and/or provided to the compliance computer system 200.

In some embodiments, the compliance computer system 200 includes a model library 206 that stores a plurality of models 208 (e.g., classifiers, regressors, clustering, etc.). In some embodiments, the model library 206 stores two more models 208 (e.g., a first model 208-1 and a second model 208-2), three or more models (e.g., the first model 208-1, a second model 208-2, a third model 208-3), four or more models 208, ten or more models 208, 50 or more models 208, or 100 or more models 208.

In some embodiments, a model 208 in the plurality of models 208 is implemented as an artificial intelligence engine for the subject question and answering system (QAS). For instance, in some embodiments, the model 208 includes one or more gradient boosting models 208, one or more random forest models 208, one or more neural network (NN) models 208, one or more regression models, one or more Naïve Bayes models 208, one or more machine learning algorithms (MLA) 116, or a combination thereof. In some embodiments, an MLA or a NN is trained from a training data set that includes one or more features identified from a data set. MLAs include supervised algorithms (such as algorithms where the features/classifications in the data set are annotated) using linear regression, logistic regression, decision trees, classification and regression trees, Naïve Bayes, nearest neighbor clustering; unsupervised algorithms (such as algorithms where no features/classification in the data set are annotated a priori), such as means clustering, principal component analysis, random forest, adaptive boosting; and semi-supervised algorithms (such as algorithms where an incomplete number of features/classifications in the data set are annotated) using generative approach (such as a mixture of Gaussian distributions, mixture of multinomial distributions, hidden Markov models), low density separation, graph-based approaches (such as minimum cut, harmonic function, manifold regularization, etc.), heuristic approaches, or support vector machines.

In some embodiments, a model 208 is in the form of a hybrid deep learning (DL) model such as a Long Short Term Memory (LSTM) model, or a bidirectional LSTM (BiLSTM) model with an attention layer based on a neural network (NN). In some embodiments a model 208 is a deep learning model in the context of a network topology and word embedding technique customized for QAS. In some embodiments, a model 208 is a conditional random fields model 208, a convolutional neural network (CNN) model 208, an attention based neural network model 208, a deep learning model 208, a long short term memory network model 208, or another form of neural network model 208.

While MLA and neural networks identify distinct approaches to machine learning, the terms may be used interchangeably herein. Thus, a reference to MLA may include a corresponding NN or a reference to NN may include a corresponding MLA unless explicitly stated otherwise. In some embodiments, the training of a respective model 208 includes providing one or more optimized datasets, labeling these features as they occur (e.g., in user profile 212 records), and training the MLA to predict or classify based on new inputs. Artificial NNs are efficient computing models which have shown their strengths in solving hard problems in artificial intelligence. For instance, artificial NNs have also been shown to be universal approximators, that is, they can represent a wide variety of functions when given appropriate parameters.

One of skill in the art will readily appreciate other models 208 that are applicable to the systems and methods of the present disclosure. In some embodiments, the systems and methods of the present disclosure utilize more than one model 208 to provide an evaluation (e.g., arrive at an evaluation given one or more inputs), such as an identity of one or more nodes (e.g., nodes 222 of FIG. 2B) within a node graph (e.g., first node graph 220-1 of FIG. 2B) to progress a respective subject to other nodes in the graph. For instance, in some embodiments, each respective model 208 arrives at a corresponding evaluation when provided a respective data set parsed from one or more messages provided by the respective subject. Accordingly, in some embodiments, each respective model 208 independently arrives at a result and then the result of each respective model 208 is collectively verified through a comparison or amalgamation of the models 208. From this, a cumulative result is provided by the models 208, either through a voting scheme across several models 208 or by virtue of the models arranged as an ensemble model. However, the present disclosure is not limited thereto.

In some embodiments, a respective model 208 is tasked with performing a corresponding activity. As a non-limiting example, in some embodiments, the task performed by the respective model 208 includes, but is not limited to, verifying an acknowledgement of consent by a respective subject (e.g., block 408 of FIG. 4A), determining a respective requirement in a corresponding plurality of requirements for a respective compliance standard (e.g., block 410 of FIG. 4A), configuring a respective compliance standard (e.g., block 422 of FIG. 4A), using a message received by the respective subject to progress the respective subject to another node in the node graph (e.g., block 428 of FIG. 4B, block 434 of FIG. 4B, etc.), determining when the respective subject satisfied a predetermined compliance question associated with a respective node in the node graph (e.g., block 428 of FIG. 4B, block 434 of FIG. 4B, etc.), identifying the respective node in a first subset of nodes as an initial node for the respective subject in the node graph (e.g., block 430 of FIG. 4B), parsing a portion of the message (e.g., block 438 of FIG. 4C), determining a characteristic of a respective text string of the message (e.g., block 438 of FIG. 4C), determining whether sufficient information has been received by the respective subject in the text-based conversation (e.g., block 444 of FIG. 4C), determining whether the respective subject satisfies at least a subset of a plurality of requirements in the corresponding plurality of requirements of the compliance standard associated with the respective node in a second subset of nodes of the node graph (e.g., block 448 of FIG. 4D), generate a corresponding report (e.g., block 454 of FIG. 4D), determining a result of an expected availability of a corresponding benefit for the respective subject (e.g., block 454 of FIG. 4D), or a combination thereof.

In some embodiments, each respective model 208 of the present disclosure makes use of 10 or more parameters, 100 or more parameters, 1,000 or more parameters, 10,000 or more parameters, or 100,000 or more parameters. In some embodiments, each respective model 208 of the present disclosure cannot be mentally performed.

In some embodiments, each model 208 includes a plurality of heuristic instructions that describe various processes for the model 208 to follow when parsing a message 1010. For instance, in some embodiments, the pattern matching model 208 includes a plurality of heuristic instructions that dictate how to parse a text object of the message into one or more text strings in accordance with a parts-of-speech analysis. This parts-of-speech analysis is provided by the plurality of heuristic instructions in some embodiments, for instance by identifying a type of clause within a text object and/or text string (e.g., identifying an independent clause and/or a dependent clause within the text object of the message). In some embodiments, one or more models 208 share one or more instructions in a plurality of heuristic instructions.

The compliance computer system 200 includes a communications platform module 214 for supporting secure communications (e.g., bidirectional conversations) between the compliance computer system 200 and one or more client devices 300. The communications platform module 214 includes a plurality of communication channels 216 (e.g., first communication channel 216-1, second communication channel 216-2, . . . , communication channel W 216-W of FIG. 2B). Each respective subject associated with a client device participates in a conversation in a respective communication channel 216. Each respective communication channel 216 includes an automated human interface module 218 (e.g., first communication channel 216-1 includes first automated human interface module 218-1, second communication channel 216-2 includes second automated human interface module 218-2, etc.) that provides capability for the compliance computer system 200 to automatically engage the respective subject in the conversation. In some embodiments, the automated human interface module 218 initiates a response to an initial message received from the respective subject based on content logic made available to the automated human interface module 218. For instance, in some embodiments, a response in a message from the respective subject triggers the automated human interface module 218 to progress the respective subject through the available content logic, which is in the form of a node graph (e.g., first node graph 220 of FIG. 2B, block 428 of FIG. 4B, etc.).

In some embodiments, the compliance computer system 200 include a reference library 230 that uses one or more databases or other form of information to obtain such information to provide to subjects, such as one or more government regulations associated with a respective compliance standard 226. For instance, if a respective entity that employs a respective subject has an internal policy that must be adhered to, this policy is incorporated within the reference library 230. Similarly, in some embodiments, local and/or regional laws and guidelines are stored in the reference library 230. To this point, in some embodiments, reference library 230 includes, and optionally updates on a recurring basis, guidelines for managing employees with disabilities or workplace restrictions, such as the Americans with Disabilities Act "Americans with Disabilities Act Title II Regulations—Nondiscrimination on the Basis of Disability in State and Local Government Services," 28 Code of Federal Regulations Part 35, as well as the Americans with Disabilities Act "Americans with Disabilities Act Title III Regulations—Nondiscrimination on the Basis of Disability by Public Accommodations and in Commercial Facilities," 28 Code of Federal Regulations Part 36, each of which is hereby incorporated by reference in its entirety. Moreover, in some embodiments, the reference library 230, and optionally updates thereof obtained on a recurring basis, includes guidelines for family and medical leave, such as the Wage and Hour Division of the United States Department of Labor, "The Employer's Guide to the Family and Medical Leave Act," WH 1421, print, which is hereby incorporated by reference in its entirety. However, the present disclosure is not limited thereto. Accordingly, the reference library 230 allows for the compliance computer system 200 to adhere to local guidelines without having to actively police these guidelines since they are automatically enforced through the compliance computer system 200. The compliance computer system 200 enforces these guidelines by reviewing this information, at least, against one or more requirements of a compliance standard associated with the local guidelines. Accurate and proper coding of compliance standard 226 information is important because it helps determine eligibility for benefits provided by the compliance standard 226. Accordingly, the reference library 230 ensures compliance with up-to-date regulations and policies, such as those that are not directly configured by an administrator of the compliance computer system 200.

In some embodiments, other databases are communicatively linked (e.g., linked through communication network 106 of FIG. 1) to the compliance computer system 200. For instance, in some embodiments, one or more communications stored on an external database store (e.g., a cloud database) is provided to the compliance computer system 200.

Each of the above identified modules and applications correspond to a set of executable instructions for performing one or more functions described above and the methods described in the present disclosure (e.g., the computer-implemented methods and other information processing methods described herein; method 400 of FIGS. 4A through 4E; etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 292 stores additional modules and data structures not described above.

Referring to FIG. 3, a description of an exemplary client device 300 that can be used with the present disclosure is provided. In some embodiments, a client device 300 includes a smart phone (e.g., an iPhone, an Android device, etc.), a laptop computer, a tablet computer, a desktop computer, a wearable device (e.g., a smart watch, a heads-up display (HUD) device, etc.), a television (e.g., a smart television), or another form of electronic device such as a gaming console, a stand-alone device, and the like.

The client device 300 illustrated in FIG. 3 has one or more processing units (CPU's) 372, a network or other communications interface 374, a memory 392 (e.g., random access memory), a user interface 376, the user interface 376 including a display 378 and input 380 (e.g., keyboard, keypad, touch screen, etc.), optional audio circuitry, an optional speaker, an optional microphone, an optional input/output (I/O) subsystem 330, one or more communication busses 370 for interconnecting the aforementioned components, and a power system 340 (e.g., power supply) for powering the aforementioned components.

In some embodiments, the input 380 is a touch-sensitive display, such as a touch-sensitive surface. In some embodiments, the user interface 376 includes one or more soft keyboard embodiments. In some embodiments, the soft keyboard embodiments include standard (QWERTY) and or non-standard configurations of symbols on the displayed icons. The input 380 and/or the user interface 376 is utilized by an end-user of the respective client device 300 (e.g., a respective subject) to input various information (e.g., a text object within a message) to the respective client device.

In some embodiments, the client device 300 illustrated in FIG. 3 optionally includes, in addition to accelerometer(s), a magnetometer, and a global positioning system (GPS or GLONASS or other global navigation system) receiver for obtaining information concerning a current location (e.g., a latitude, a longitude, an elevation, etc.) and/or an orientation (e.g., a portrait or a landscape orientation of the device) of the client device 300. In some embodiments, the location of the client device 300 provides information related to a respective compliance standard (e.g., a location of the client device is associated with Germany signaling and so German compliance standards are selected). Thus, in some embodiments, the location of the client device 300 provides information related to a respective compliance standard that a respective subject is or is not eligible for (e.g., the location of the client device is associated with Germany signaling the respective subject is under German jurisdiction for one or more compliance standards). In some embodiments, the location of the client device sets the language. However, the present disclosure is not limited thereto. In some embodiments, the location of the client device is not used to set the language. For instance, in some embodiments the device default language or the subject's login profile sets the language. In some embodiments, the location of the client device is not used to set the compliance standard. Rather, the systems and methods of the present disclosure query the respective subject for location information, and based on the answers to these queries, identifies the relevant compliance standard.

It should be appreciated that the client device 300 illustrated in FIG. 3 is only one example of a multifunctional device that may be used for receiving messages, providing messages, evaluating a message, displaying a corresponding report for the respective subject, or a combination thereof. Thus, the client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits. In some embodiments client device 300 is a desktop or laptop computer.

The memory 392 of the client device 300 illustrated in FIG. 3 optionally includes high-speed random access memory and optionally also includes non-volatile memory, such as one or more magnetic disk storage devices, flash memory devices, or other non-volatile solid-state memory devices. Access to the memory 392 by other components of the client device 300, such as CPU(s) 372 is, optionally, controlled by the memory controller.

In some embodiments, the one or more CPU(s) 372 run or execute various software programs and/or sets of instructions stored in the memory 392, such as the client application 306, to perform various functions for the client device 300 and process data.

In some embodiments, the CPU(s) 372 and the memory controller are implemented on a single chip. In some other embodiments, the CPU(s) 372 and the memory controller are implemented on separate chips.

In some embodiments, the audio circuitry, the optional speaker, and the optional microphone provide an audio interface between the respective subject and the client device 300, enabling the client device to provide a message that include audio data provided through the audio circuitry, the optional speaker, and/or the optional microphone. The audio circuitry receives audio data from the peripherals interface, converts the audio data to electrical signals, and transmits the electrical signals to the speaker. The speaker converts the electrical signals to human-audible sound waves. The audio circuitry also receives electrical signals converted by the microphone from sound waves. The audio circuitry converts the electrical signal to audio data and transmits the audio data to peripherals interface for processing. Audio data is, optionally, retrieved from and or transmitted to the memory 392 and or the RF circuitry by the peripherals interface.

In some embodiments, the power system 340 optionally includes a power management system, one or more power sources (e.g., one or more batteries, alternating current (AC)), a recharging system, a power failure detection circuit, a power converter or inverter, a power status indicator (e.g., a light-emitting diode (LED)) and any other components associated with the generation, management, and distribution of power in portable devices.

In some embodiments, the client device 300 optionally also includes one or more optical sensors. The optical sensor(s) optionally include charge-coupled device (CCD) or complementary metal-oxide semiconductor (CMOS) phototransistors. The optical sensor(s) receive light from the environment, projected through one or more lens, and converts the light to data representing an image. The optical sensor(s) optionally capture still images and or video. In some embodiments, an optical sensor is disposed on a back end portion of the client device 300 (e.g., opposite the display 378 on a front end portion of the client device 300) so that the input 380 is enabled for use as a viewfinder for still and or video image acquisition. In some embodiments, another optical sensor is located on the front end portion of the client device 300 so that an image of the respective subject is obtained (e.g., to capture a user profile image). In some embodiments, a message provided by the client device includes an image and or video captured by the optical sensor (e.g., the message includes a video feed or an image such as a picture).

In some embodiments, the memory 392 of the client device 300 stores:
- an operating system 302 that includes procedures for handling various basic system services;
- an electronic address 304 associated with the client device 300; and
- a client application for presenting media, such as a communications platform for providing and receiving a plurality of messages within a respective communication channel.

As illustrated in FIG. 3, a client device 300 preferably includes an operating system 302 that includes procedures for handling various basic system services. The operating system 302 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 304 is associated with each client device 300, which is utilized to at least uniquely identify the client device from other devices and components of the system 100. In some embodiments, the electronic address 304 of the client device 300 has the same functionality as the electronic address 204 of the compliance computer system 200. However, the present disclosure is not limited thereto.

Figure 8:
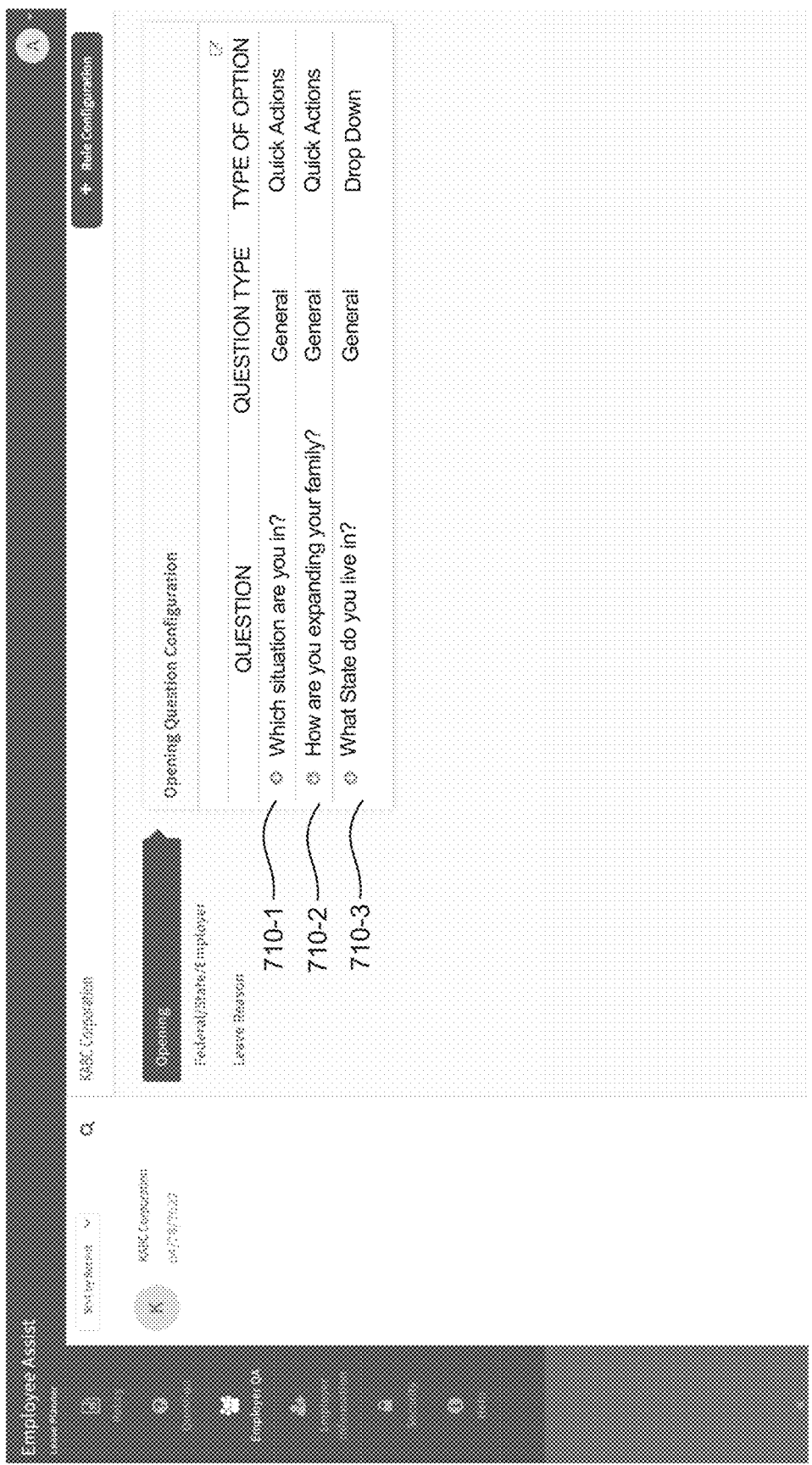
FIG. 8 illustrates a user interface of a display of a client device that allows an end-user to configure a node graph of an automated human interaction module, in accordance with an exemplary embodiment of the present disclosure.

In some embodiments, the client application 306 is a group of instructions that, when executed by the processor 372, generates content for presentation to the respective subject (e.g., user interface 500 of FIG. 5, user interface 600 of FIG. 6, user interface 700 of FIG. 7, user interface 800 of FIG. 8, user interface 900 of FIG. 9, user interface 1000 of FIG. 10, user interface 1100 of FIG. 11, user interface 1200 of FIG. 12, user interface 1300 of FIG. 13, user interface 1400 of FIG. 14, user interface 1500 of FIG. 15, user interface 1600 of FIG. 16, or a combination thereof), such as a result of a corresponding report (e.g., report 1210-1 of FIG. 12) generated by one or more models 208. In some embodiments, the client application 306 generates content in response to one or more inputs received from the respective subject through the client device 300, such as the inputs 380 of the client device 300.

In some embodiments, the client device 300 has any or all of the circuitry, hardware components, and software components found in the system depicted in FIG. 3. In the interest of brevity and clarity, only a few of the possible components of the client device 300 are shown to better emphasize the additional software modules that are installed on the client device.

Now that a general topology of the distributed system 100 has been described in accordance with various embodiments of the present disclosures, details regarding some processes in accordance with FIGS. 4A through 4E will be described.

FIGS. 4A through 4E illustrate a flow chart of methods (e.g., method 400) for evaluating information provided by a respective subject and/or displaying subject-specific information for a compliance standard based on the evaluating of the information, in accordance with embodiments of the present disclosure. Specifically, exemplary method 400 is directed to evaluating and displaying subject-specific compliance standard information, in accordance with some embodiments of the present disclosure. In the flow charts, the preferred parts of the methods are shown in solid line boxes, whereas optional variants of the methods, or optional equipment used by the methods, are shown in dashed line boxes.

Various modules in the memory 292 of the compliance computer system 200 (e.g., model library 206, user profile library 210, communications platform module 214, reference library 230, or a combination thereof of FIGS. 2A and 2B), the memory 392 of the client device 300 (e.g., client application 306 of FIG. 3), or both perform certain processes of the methods 400 described in FIGS. 4A through 4E, unless expressly stated otherwise. Furthermore, it will be appreciated that the processes in FIGS. 4A through 4E can be encoded in a single module or any combination of modules.

Block 402. Referring to block 402 of FIG. 4A, a method for evaluating and/or displaying subject-specific compliance standard information is provided.

The method is performed at a computer system (e.g., compliance computer system 200 of FIGS. 2A and 2B). The computer system 200 includes one or more processors (e.g., CPU(s) 272 of FIG. 2A) and a memory (e.g., memory 292 of FIGS. 2A and 2B). In operation, the computer system 200 enables both employees (e.g., a respective subject) and managers (e.g., an administrator of the compliance computer system 200 or a privileged user of the compliance computer system 200) of one or more companies to access and interact with information managed and/or provided to the computer system 200.

As such, portions of the method 400 require a computer (e.g., computer system 200 of FIG. 1) to be used because the considerations used by the systems and methods of the present disclosure, on the scale performed by the systems and methods of the present disclosure, cannot be mentally performed. In other words, the systems and methods of the present disclosure have outputs (e.g., report 1210) that needs to be determined using the computer rather than mentally in such embodiments.

Furthermore, the method 400 is performed for each respective subject in a plurality of subjects. In some embodiments, the plurality of subjects includes more than 10 subjects, more than 50 subjects, more than 100 subjects, more than 250 subjects, more than 500 subjects, more than 1,000 subjects, more than 5,000 subjects, more than 10,000 subjects, or more than 50,000 subjects (e.g., about 65,000 subjects). Accordingly, the method 400 is capable of provided individualized evaluations of subject specific compliance standard information for each respective subject in the plurality of subjects. Furthermore, given the scale of the plurality of subjects, the methods of the present disclosure cannot be mentally performed, and, therefore, require utilizing the computer system 200.

Block 404. Referring to block 404, the method 400 includes receiving a respective first message (e.g., first message 1010-1 of FIG. 16) from the respective subject. In some embodiments, the respective first message includes a request to engage in a conversation through a respective communication channel. In some embodiments, this respective communication channel is in a plurality of communication channels. In some embodiments there is only one communication channel. In some embodiments, the conversation includes a text-based conversation. However, the present disclosure is not limited thereto.

In some embodiments, to trigger initialization of a respective communication channel 216 hosted by an automated human interface module 218, the automated human interface module 218 presents the respective subject with an initial message (e.g., first message 1010-1 of FIG. 12) and one or more options for responses to select from that are accurately relevant to a task the respective subject is interested in, such as determining eligibility for a respective compliance standard 226 in a plurality of compliance standards 226 (e.g., first compliance standard 226-1 of FIG. 2B). For instance, referring briefly to FIG. 10, in some embodiments, the automated human interface module 218 presents the respective subject with the initial message (e.g., an initial predetermined compliance question 224), such as a first message 1010-1 of FIG. 11 that states, "To get started, please select which situation you are in." In some embodiments, the automated human interface module 218 presents through the first message 1010-1 the respective subject with one or more options for responses to the initial message (e.g., a first option "Adding to my family," a second option "Dealing with an illness/injury," etc.). However, the present disclosure is not limited thereto. For instance, referring briefly to FIG. 11, in some embodiments, the respective subject is provided with a mechanism 1100 (e.g., radio button mechanism, text entry mechanism, voice capture mechanism, etc.) that allows the respective subject to input (e.g., via input 380 of client device 300) a first message 1010-1 to the automated human interface module 218. Accordingly, in some such embodiments, method processes the first message 1010-1, such as by using a speech-to-text model 208, such that the automated human interface module 218 provides a responsive message 1010 to the first message 1010-1 formed from the one or more utterances captured from the respective subject. In some embodiments, the responsive message is generated based on available logic, such as by providing a message 1010 including a corresponding predetermined compliance question 224 associated with an initial node 222, in which the initial node is selected based on the first message 1010-1. However, the present disclosure is not limited there.

In some embodiments, the respective communication channel supports a two-way, duplex, conversation, for example, a business to consumer (B2C) conversation between the respective subject (e.g., the consumer or employee) and the automated human interface module 218, which acts as an agent for the business. In some embodiments, the respective communication channel 216 is configured for web-based chat, such as a mobile chat, that replaces electronic mail. Accordingly, in some such embodiments, this mobile chat takes the form of a conversation within the respective communication channel, such as a text-based conversation. However, the present disclosure is not limited thereto.

In some embodiments, the respective first message 1010-1 includes a respective first application programming interface ("API") token, which is at least utilized to uniquely identify the respective text-based conversation or the respective subject, such as by identifying the respective communication channel 216 within the plurality of communication channels 216 or the electronic address of the subject's associated device 300. In some embodiments the API token is uniquely associated with a subject. In some embodiments the API token is uniquely associated with a conversation. In some embodiments the API token allows multiple conversations with multiple recipients to be hosted by a common communication channel. That is, although multiples messages may exist on the channel, each message is flagged by a token indicating which subject, or which conversation, the message is associated with.

In some embodiments, a client application of the respective client device (e.g., client application 306 of client device 300 of FIG. 3) invokes an API call within the conversation. In response to this API call, a communications platform module (e.g., communications platform module 214 of FIG. 2B) receives the API call and makes another API call to a back-end system associated with the compliance computer system, such as a remote computer system administrated by an employer of the respective subject, and gets a query result of the API call. In some embodiments, the query result is translated from a first format into a second format by the communications platform module, which is then returned to the client device 300 for display within the communication channel.

Accordingly, in some such embodiments, the method 400 allows the computer compliance system 200 and/or the client device 300 to be configured with an API to integrate with, such as direct integration and/or database integration) with other external services (e.g., one or more enterprise resource databases, etc.).

Block 406. Referring to block 406, in some embodiments, the plurality of communication channels 216 includes 10 or more communication channels, 50 or more communication channels, 100 or more communication channels, 250 or more communication channels, 2,000 or more communication channels, 5,000 or more communication channels, 10,000 or more communication channels, or 100,000 or more communication channels. However, as noted above, in some embodiments there is only a single communication channel hosting multiple conversations concurrently. In still other embodiments each of a plurality of communication channels hosts a different plurality of conversations. In still other embodiments, each respective communication channel in a plurality of communication channels host a single corresponding conversation. Regardless of the architecture, in some embodiments, 4 or more, 6 or more, 8 or more, 10 or more, 20 or more, 30 or more, 40 or more, between 5 and 1000, 100 or more, or 1000 or more conversations are concurrently supported in some embodiments of the present disclosure.

Block 408. Referring to block 408, in some embodiments, the respective first message it utilized to obtain characteristic information associated with the respective subject. For instance, in some embodiments, the respective first message includes an acknowledgement of consent by the respective subject for the compliance computer system 200 to obtain to obtain characteristic information associated with the respective subject, such as sensitive information (e.g., PII, employee records, etc.). As a non-limiting example, the acknowledgement of consent by the respective subject is an electronic signature of the respective subject associated with a consent form file. Accordingly, by obtaining the acknowledgement of consent by the respective subject, the method 400 is capable of providing personalized evaluations for the respective subject since such evaluations require obtaining sensitive, characteristic information associated with the respective subject, such as to evaluate an estimate of current (e.g., actual) wage protection and/or future compensation, PTO, one or more accrued balances of the respective subject that contribute towards the corresponding benefit (e.g., towards pay and/or job protection).

In some embodiments, to obtain the characteristic information, as part of a login process, a respective communication channel 216 is generated for the respective subject based upon the information stored in the corresponding user profile for the respective subject.

In some embodiments, once an identity of the respective subject is obtained (e.g., by asking the respective subject), characteristic information from a user profile corresponding to the respective subject that is stored across one or more data stores (e.g., second user profile 212-2 of user profile library 210 corresponds to the respective subject) is retrieved. In some embodiments, the characteristic information includes, for example, demographic information of the respective subject, preferences of the respective subject on different subjects or topics (e.g., insurance premium preferences, etc.), location information of the respective subject, and the like. In some embodiments, the characteristic information is obtained in order to determine if the respective subject satisfies one or more requirements 228 associated with a respective compliance standard 226.

In some embodiments, the corresponding user profile 212 for the respective subject includes a unique identifier of the respective subject (e.g., a contact number of the respective subject, an employee number of the respective subject, etc.), a title of the respective subject, a geographic address (e.g., street address) associated with the respective subject, and the like. In some embodiments, the unique identifier of the respective subject is utilized by the compliance computer system 200 to obtain further information regarding the respective subject, such as by utilizing the unique identifier to access a secure database associated with the respective subject (e.g., an employee records database, a medical record database, etc.). Accordingly, the method 400 is capable of providing personalized evaluations for the respective subject since such evaluations require obtaining information for access privileges the unique identifier of the respective subject, which is utilized to determine if the respective subject satisfies one or more requirements 228 associated with a respective compliance standard 226. However, the present disclosure is not limited thereto.

In some embodiments, the corresponding user profile 212 for the respective subject includes information about employment of the respective subject at an employer such as the unique identifier associated with the respective subject, qualification information associated with the respective subject, current job information associated with the respective subject (e.g., prior promotion history, one or more supervisors of the respective subject, etc.), an availability status respective subject, archive data associated with the respective subject (e.g., prior paid time off (PTO) taken by the respective subject), how long the respective subject has worked for the employer (e.g., time since the respective subject first started work for the employer, time since the respective subject first started a role for the employer, etc.), a seniority, rank or title of the respective subject, and the like. By utilizing the information about employment of the respective subject, the method 400 is capable of providing personalized evaluations for the respective subject since such evaluations require employment information of the respective subject for evaluation to determine if the respective subject satisfies one or more requirements 228 associated with a respective compliance standard 226.

In some embodiments, the unique identifier associated with the respective subject includes a unique numeric or alpha-numeric sequence that is assigned by the employer to the respective subject when employed by the employer. In some embodiments, the unique identifier includes certified identification, such as a social security number associated with the respective subject, an immigration visa number associated with the respective subject, a driver's license number associated with the respective subject, or the like. In some embodiments, the unique identifier includes biometric data, such as a voiceprint, a fingerprint, a retinal print or a combination thereof that is associated with the respective subject. However, the present disclosure is not limited thereto.

In some embodiments, the biographical information associated with the respective subject includes personal identifiable information ("PII") about the respective subject. As a non-limiting example, in some embodiments, the biographical information includes a birth date of the respective subject, a home and/or mailing address of the respective subject, contact information associated with the respective subject, healthcare insurance information associated with the respective subject (e.g., a health insurance provider of the respective subject, a health insurance plan of the respective subject, etc.), life insurance information associated with the respective subject (e.g., a life insurance provider of the respective subject, a life insurance plan of the respective subject, etc.), banking information associated with the respective subject (e.g., a 401K account information), or a combination thereof. However, the present disclosure is not limited thereto. By utilizing the biographical information of the respective subject, the method 400 is capable of providing personalized evaluations for the respective subject since such evaluations require biographical information of the respective subject for evaluation to determine if the respective subject satisfies one or more requirements 228 associated with a respective compliance standard 226.

In some embodiments, the qualification information associated with the respective subject includes information indicative of employment capacity or history. For instance, in some embodiments, the qualification information includes a seniority level of the respective subject at the employer (e.g., number of years of employment the respective subject has worked, where respective subject ranks in a management hierarchy of the employer, etc.), job qualifications associated with the respective subject (e.g., type of job that the respective subject is qualified for, level or grade of the respective subject based on different responsibility levels and/or different pay levels, etc.), special skills of the respective subject (e.g., licensed to perform a certain action, status of certain activities to be fulfilled by the respective subject during a given time period, such as number of hours needed to maintain qualifications of the respective subject, etc.), an education of respective subject (e.g., what educational institution and/or degree the respective subject is enrolled in, etc.), or a combination thereof. However, the present disclosure is not limited thereto.

In some embodiments, the current job information associated with the respective subject includes information indicative of a current employment status of the respective subject. For instance, in some embodiments, the current job information associated with the respective subject includes an employment initial start date of the respective subject at the employer, employment daily start and/or end time(s) of the respective subject, a description of the responsibilities of the respective subject when employed by the employer, a base location for employment of the respective subject (e.g., postal code associated with the home residence of the respective subject, office location information of where the respective subject primarily works, etc.), or a combination thereof.

In this way, the method 400 is personalized to the respective subject since the method 400 is capable of obtaining information associated with the respective subject, either directly from the respective subject (e.g., via message 1010) or indirectly (e.g., by retrieval from a remote database), which is utilized to determine if the respective subject satisfies one or more requirements 228 associated with a respective compliance standard 226.

Block 410. Referring to block 410, the method 400 includes engaging an automated human interface module (e.g., first automated human interface module 218-1 of FIG. 2B) with the respective subject through the text-based conversation in the respective communication channel 216.

In some embodiments, the automated human interface module 218 provides conversational engagement with the respective subject in the respective communication. For instance, in some embodiments, the automated human interface module 218 provides a simple static response to by providing one or more predetermined compliance questions 224 to the respective subject (e.g., providing a questionnaire to the respective subject that includes a plurality of predetermined compliance questions 224). However, the present disclosure is not limited thereto. For instance, in some embodiments, the automated human interface module 218 provides sophisticated knowledge conversational engagement that is utilized to drive progression through an automated conversation that is based on an intelligent selection of compliance questions 224. From this, by utilizing the automated human interface module 218 the respective subject is evaluated to determine if deemed to satisfy a plurality of requirements 228 to obtain a corresponding benefit of a respective compliance standard 226. Accordingly, each automated human interface module 218 provides a capability for automatically engaging the respective subject in a conversational flow within the respective communication channel 216. Accordingly, in some such embodiments, the automated human interface module 218 helps the respective subject evaluate subject-specific compliance standard 226 information, such as by resolving a question or problem of the respective subject related to obtaining a corresponding benefit for a respective compliance standard 226. In this way, the automated human interface module 218 reduces a cognitive burden on the respective subject by allowing the respective subject to provide information required to determine if the respective subject is deemed to satisfy the plurality of requirements 228 to obtain the corresponding benefit of the respective compliance standard 226, without requiring the respective subject to reference a requirement 228 in the plurality of requirements or to have knowledge of the corresponding benefit or the respective compliance standard 226.

In some embodiments, the conversation with the automated human interface module 218 is initiated when the first respective message from the respective subject associated with a client device 300 is assigned to the automated human interface module 218. Accordingly, the automated human interface module 218 initiates a response to the first message based on available logic, such as a by providing within a message 1010 a corresponding predetermined compliance question 224 associated with an initial node 222. However, the present disclosure is not limited there.

Furthermore, in some embodiments, the automated human interface module 218 is designed to be able to pull information about the respective subject and/or a respective compliance standard 226, such as from one or more external data systems. In some embodiments, this pulling of information is facilitated by allowing the automated human interface module 218 to make an authenticated call to a data source (e.g., remote database) in order to pull information in for the respective subject, such as an out of time off work the respective subject has utilized within the past calendar year. Accordingly, the automated human interface module 219 is provided substantially real-time knowledge of pertinent information associated with the respective subject. From this, the method 400 takes into consideration changing and evolving eligibility of the respective subject, such as in the case where a requirement for the respective compliance requirement 226 change with time, among other possibilities.

In some embodiments, "real-time" means one or more operations in which a computer system activity match a human perception of a period of time or proceed at rate similar to an external physical process. In some embodiments, a real-time operation is conducted in a period of time of a few milli-seconds (ms) or faster in length. In this way, the automated human interface module 218 provides assistance to the respective subject in a resource efficient manner, such as by determining if the respective subject is deemed to satisfy the plurality of requirements 228 to obtain the corresponding benefit of the respective compliance standard 226 in a real-time manner.

In some embodiments, the automated human interface module 218 includes a node graph 220. Each node graph 220 includes a plurality of nodes 222 (e.g., first node 222-1, second node 222-2, . . . node S 222-S of FIG. 2B). Each respective node 222 in the plurality of nodes 222 is connected to at least one other node 222 in the plurality of nodes 222, such as a first edge that connects a first node 222-1 to a fifth node 222-5.

In some embodiments, each respective node 222 in at least a first subset of the plurality of nodes 222, as referred herein as a "first subject of nodes 222" is associated with at least one predetermined compliance question (e.g., first node 222-1 is associated with first compliance question 224-1, second node 222-2 is associated with second compliance question 224-2 and third compliance question 224-2, etc.). Each predetermined compliance question 224 includes a prompt to a subject that is configured to obtain information from the subject. For instance, in some embodiments, a first predetermined compliance question 224-1 is configured to determine if the subject satisfies a requirement 228 of a compliance standard 226, such as a first requirement 228-1 for eligibility for a corresponding benefit of the compliance standard 226.

As a non-limiting example, consider a first compliance standard 226-1 associated with excused absences for administrative leave. Such excused absences include time off from work for a subject without charge to leave or loss of pay. In some embodiments, each respective node in at least a second subset of the plurality of nodes is associated with a respective compliance standard 226 in a plurality of compliance standards 226. The respective compliance standard includes a corresponding plurality of requirements 228 for compliance with the respective compliance standard. Accordingly, utilizing the same non-limiting example, a first requirement 228-1 of the first compliance standard 226-1 has a condition that the subject be absent from work for a reason from a predetermined list of reasons including voting, voter registration, employment-replayed conference attendance, blood donation services, visits to human resources services, visits to equal employment opportunity services, union representation attendance, medical services related to on the job-related injuries and/or illness, employment related surveillance program attendance, or a combination thereof. From this first requirement 228-1, a first node 222-1 is associated with a first predetermined compliance question 224-1 that is configured to elicit a response from the subject in order to determine if the subject has the condition that the subject be absent from work for the reason from the predetermined list of reasons. Moreover, in some embodiments, the first compliance standard 226-1 includes a second requirement 228-2 of the first compliance standard 226-1 requires that the subject is allowed to utilized up to 7 days of paid leave per calendar year to serve as a bone marrow donor, a third requirement 228-3 that the subject is allowed to utilized up 30 days to be an organ donor in addition to sick leave or annual leave, a fourth requirement 228-4 that when the subject has fewer than 80 hours of accrued sick leave that the subject is granted up to 4 fours for preventative health care, a fifth requirement 228-5 that the excused absence or administrative leave is not granted when the subject is currenting conducting a disciplinary action with the employer, or a combination thereof. Accordingly, in some embodiments, second node 222-2 is associated with a second predetermined compliance question 224-2 that is configured to elicit a response from the subject in order to determine if the subject is planning to be absent from work in order to serve as a bone marrow donor. One of skill in the art will appreciated that the present disclosure is not limited thereto.

In some embodiments, a respective requirement 228 is associated with a characteristic of the respective entity that employs the respective subject. For instance, the federal FMLA regulation is only application to employers that have at least fifty employees, who have been employed by that employer for at least twelve months, and who have worked for that employer for at least 1,250 hours in the past year.

For the purposes of the present disclosure, the systems and methods are described in the context of a plurality of compliance standards 226 that is utilized to manage time off work for a respective subject, such as sick leave or maternity leave. However, one of skill in the art will appreciate that the systems and methods of the present disclosure are applicable to a wide variety of industry where employee resources need to be managed, such as one or more transportation industries (e.g., airline industry and/or trucking industry, etc.), one or more government institutions or service industries (e.g., teachers, nurses, etc.), one or more technology industries (e.g., a life sciences research and development industry, a software-as-a-service industry, etc.), one or more healthcare industries, one or more manufacturing industries, or the like. As such, the systems and methods of the present disclosure are capable of providing individualized, subject-specific evaluations for a subject employed by an entity working in a complex, regulated industry.

Accordingly, in some such embodiments, the automated human interface module 218 retrieves characteristic information pertaining to the respective subject from one or more databases (e.g., user profile library 210, reference library 230), for example, by performing a database lookup. As a non-limiting example, in some embodiments, the automated human interface module 218 includes support for sensitive data (e.g., PII) when engaging with a respective subject through a respective communication channel 216. For instance, in some embodiments, the acknowledgement of consent obtained by the respective subject allows for the automated human interface module to obtain and use personally identifiable information associated with the respective subject. In such embodiments, a node 222 in the node graph 220 of the automated human interface module 218 is configured to utilize sensitive data, thereby acting as a sensitive data node. For instance, in some embodiments, a first node 222-1 in the node graph 220 of the automated human interface module 218 is a sensitive data node and a second node 222-2 in the node graph 220 a not a sensitive data node. In some embodiments, support for sensitive data is provided by a single node 222 (e.g., fourth node 222-4 of FIG. 2B), a subset of nodes 222 (e.g., a first subset of nodes 222 in a plurality of nodes 222 of the node graph 220), or all nodes 222 of the node graph 220. In some embodiments, data associated with the sensitive data node 222 (e.g., obtained from the respective subject in accordance with a predetermined compliance question 224 associated with the node 222) is stored as masked data.

Block 412. Referring to block 412, in some embodiments, the compliance standard 226 is specific to a respective government institution or service, a respective entity that employs the respective subject (e.g., employer), or both. For instance, in some embodiments, the compliance standard 226 is configured, or administrated by, an entity such as a government, an industry, a union, or an employer of the respect. As a first non-limiting example, consider the Family Medical Leave Act (FMLA) compliance standard 226 that is specific to the United States Federal government in accordance with the FMLA of 1993.

As such, in some embodiments, a respective compliance standard 226 in the plurality of compliance standards 226 is associated with a government institution or service, such as regulation or statute. Non-limiting examples of such government institutions or services include a regional government (e.g., world trade organization ("WTO"), a Federal government (e.g., Federal government of the United States, etc.), a State government (e.g., State of Florida), a Province government (e.g., Guangdong Province), county government (e.g., Monterey County), municipal government (e.g., Oakland City government), and the like. In some embodiments, the respective compliance standard 226 is associated with a collective bargaining agreement, such as a union. Furthermore, in some embodiments, the respective compliance standard 226 is associated with an employer of a subject. One of skill in the art will appreciate that wide variety of government institutions or services that are applicable to the systems and methods of the present disclosure.

Accordingly, in some embodiments, each respective compliance standard 226 includes a corresponding plurality of requirements 228 that provide one or more constraints or conditions that define eligibility for a corresponding benefit of the respective compliance standard 226. In some embodiments, the corresponding plurality of requirements 228 include: a number of consecutive hours a subject is allowed to work without a break; a maximum number of hours a subject is allowed to work during a given time period, such as a week, a month, a fiscal quarter, a calendar year, etc.; the qualifications/experience needed (e.g., 500 hours experience each calendar year); or the like. However, the present disclosure is not limited thereto.

In some embodiments, a respective requirement within the corresponding plurality of requirements 228 is specific for one or more subjects working in certain particular industries or fields. As a non-limiting example, a first requirement 228-1 of a first compliance standard 226-1 for Leave Without Pay (LWOP), which provides a temporary non-pay status and absence from duty, for a subject that is an engineer and a second requirement 228-2 of the first compliance standard 226-1 for the subject that is a medical practitioner. One of skill in the art will appreciate that the systems and methods of the present disclosure are not limited thereto.

In some embodiments, the respective subject belongs to one or more unions or other identified employer groups, such that one or more requirements 228 of a respective compliance standard 226 is configured by a collective bargaining agreement between the one or more union or other identified employer groups and the respective entity that employs the respective subject. In some embodiments, the collective bargaining agreement is stored for reference, such as when a respective requirement 228 requires updating due to new terms in the agreement (e.g., stored within reference library 230 of the compliance computer system 200 of FIG. 2B). As a non-limiting example, in some embodiments, the one or more requirements 228 of the respective compliance standard 226 include a first requirement 228-1 that defines a minimum number of hours that a subject is guaranteed to work, a second requirement 228-2 that defines a number of allowed vacation days, sick days, etc. for the respective subject, and the like.

Block 414. Referring to block 414, in some embodiments, the plurality of nodes 222 includes 5 or more nodes, 10 or more nodes, 100 or more nodes, 150 ore more nodes, 500 or more nodes, 1,000 or more nodes, 5,000 or more nodes, 7,500 or more nodes, 15,000 or more nodes, 60,000 or more nodes, or 100,000 or more nodes. Accordingly, given the scale of the plurality of nodes 222, the methods of the present disclosure cannot be mentally performed, and, therefore, require utilizing the computer system 200. This is particularly the case when the number of conversations that are concurrently hosted is considered.

Block 416. Referring to block 416, in some embodiments, each node 222 in the second subset of nodes is associated with at least two nodes in the first subset of nodes. Accordingly, each node 222 in the second subset of nodes has at least two predetermined compliance questions 224 the respective subject must provide responses for. However, the present disclosure is not limited thereto.

Block 418. Referring to block 418, in some embodiments, the node graph 220 is a binary node graph, such that each node 222 has a degree of two (e.g., at most two child nodes 222). However the present disclosure is not limited thereto.

For instance, in some embodiments, the node graph 220 has a binary tree structure for each node 222 in the first subset of nodes 222, for instance, except each node 222 in the second subset of nodes 222.

Block 420. Referring to block 420, in some embodiments, the automated human interface module 218 includes an audio and voice response module, which allows for the automated human interface module 218 to engage with the respective subject using utterance-base conversations (e.g., talking). For instance, in some embodiments, a respective message includes audio data, such as a voice recording (e.g., received through communication network 106 via client device 300, received through a microphone input 380 of FIG. 3, etc.), an audio portion of a video file, and the like. In some embodiments, a voice associated with the automated human interaction module 218 within the conversation is provided by a subject of the respective entity that employs the respective subject, such as a CEO of the respective entity. However, the present disclosure is not limited thereto.

Block 422. Referring to block 422 of FIG. 4B, in some embodiments, a predetermined compliance question 224 is configured by an administrator associated with the respective entity that employs the respective subject. As a non-limiting example, in some embodiments, the method 400 provides an ability to create, manage and administer the automated human interface module 218 by configuring one or more predetermined questions 224 utilized by the automated human interface module 218 via a communication channel user interface. For instance, in some embodiments, the administrator uses a user interface based automated message flow builder or uploads VXML, or properly formatted JSON files.

Figure 7:
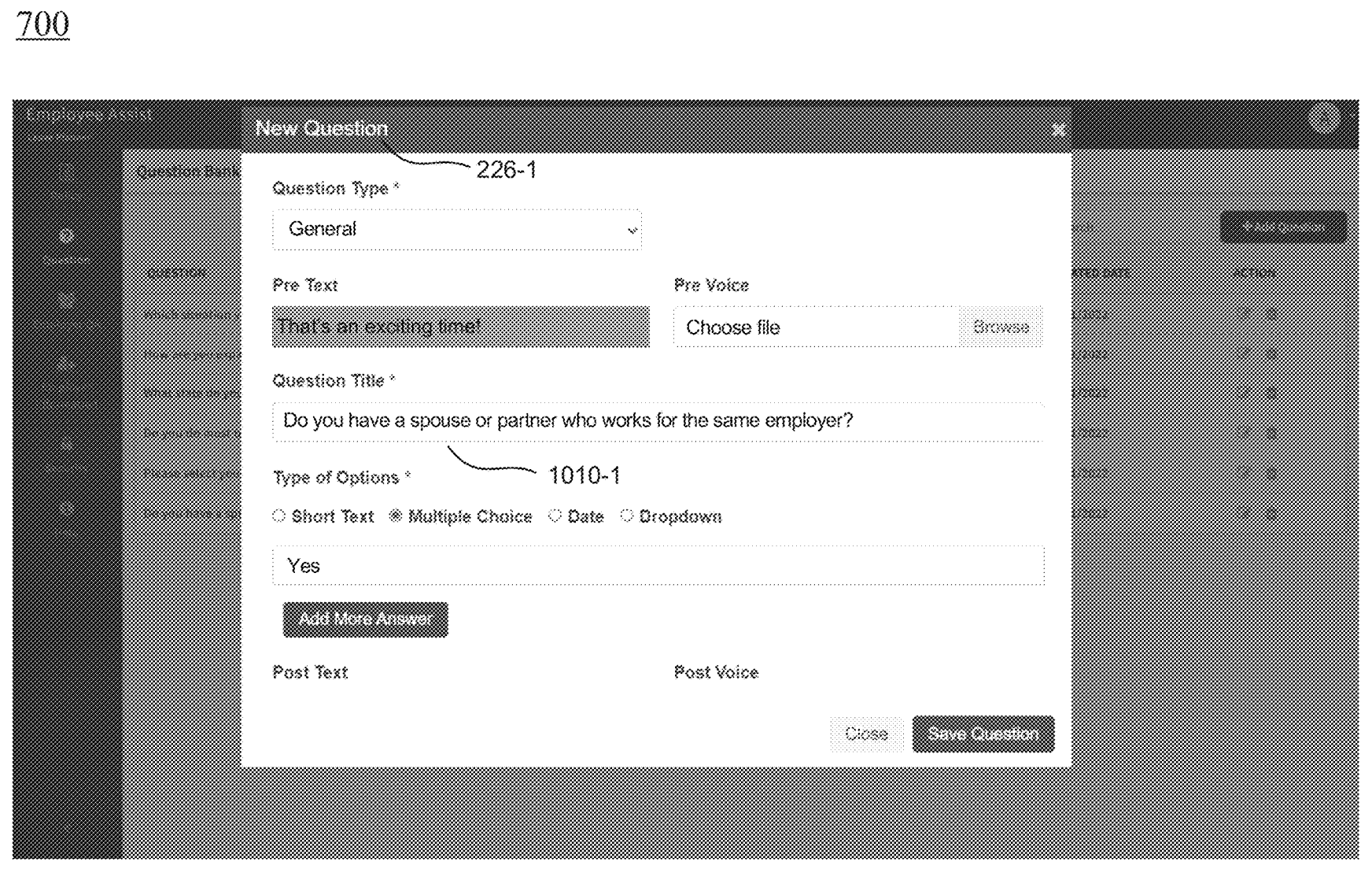

Referring briefly to FIG. 7, a user interface 700 allows an end-user to configure a predetermined compliance question 224 (e.g., form a New Question). In some embodiments, the configuration of the predetermined compliance question 224 allows for forming an association between the predetermined compliance question 224 and one or more compliance standards 226. As a non-limiting example, a first predetermined compliance question 226-1 configured through the user interface 700 has a general association, such that the first predetermined compliance question 226-1, which communicates a message (e.g., message 1010-1 of question 224 of FIG. 7, which appears in the communication channel 216, such as communication channel 216 of FIG. 11) in a communication channel 216 asking a subject "Do you have a spouse or partner who works for the same employer?" is applicable, or associated with, each compliance standard 226. In some such embodiments, the user interface 700 further allows the end-user to configure a response type (e.g., an enumerated response type) the subject is allowed to provide within a message when prompted with the predetermined compliance question 226-6. For instance, the first predetermined compliance question 226-1 configured through the user interface 700 allows for the subject to select from a multiple choice response, as opposed to a short text free form response, a dropdown menu response, a date response, or a combination thereof. However, the present disclosure is not limited thereto. Accordingly, the predetermined compliance question 224 configured by the administrator allows for the creation of underlying content and functional flow logic structure of the node graph 220 based on an association between a respective node 222 and a requirement 228 of a compliance standard 226 for which the predetermined compliance question 224 is configured to prompt the subject for information in furtherance of satisfying the requirement 228. In this way, at least a subset of the nodes 222 in the node graph 220 are customized by the administrator so that they each are associated with one or more predetermined compliance question 226 for subjects, where such subjects are employed by a respective entity that is bound by one or more compliance standards, and where such compliance questions seek to elicit compliance details necessary determine whether subjects comply with these applicable compliance standards. Moreover, by allowing the end-user to configure a predetermined compliance question 224, such as a HR representative of the employer for the respective subject, the end-user to tailor the predetermined compliance question 224 in a manner that is particular to a subject at the employer, such as by using language within the text string 710 specific to the employer.

Block 424. Referring to block 424, in some embodiments, a compliance standard 226 is defined, at least in part, by a federal government entity or service, a state government entity or service, a county government entity or service, a municipal government entity or service, or the respective entity that employs the respective subject.

Block 426. Referring to block 426, in some embodiments, a predetermined compliance question 224 associated with a respective node includes an explanation of a corresponding compliance standard 226 associated with the respective node. In some embodiments, the explanation of the corresponding compliance standard 226 is configured by the administrator associated with the respective entity that employs the respective subject, which allows the administrator to tailor the explanation of the corresponding compliance standard 226 to the respective entity. In some embodiments, the explanation of the corresponding compliance standard 226 is defined by a regulation or statute (e.g., regulation or statute), which forms the basis of the explanation. However, the present disclosure is not limited thereto. For instance, in some embodiments, the explanation of the corresponding compliance standard 226 is configured by the automated human interface module 218, which allows the automated human interface module 218 to tailor the explanation of the corresponding compliance standard 226 to the respective subject. For instance, referring to FIG. 15, in some embodiments, an explanation of "*Leave Increments for Parental/Bonding Leave: continuous, Intermittent in blocks of two weeks or more; plus up to 2 occasions of less than 2 weeks. Employee can elect or employer can require use of accrued paid time off during leave," is tailored to "*Leave Increments for Parental/Bonding Leave: continuous, Intermittent in blocks of two weeks or more," when the automated human interface module 218 knows the respective subject does not have an accrued paid time off. However, the present disclosure is not limited thereto. Moreover, it will be appreciated that while a node may be associated with a compliance standard, in typical embodiments this means that the node addresses one component of the compliance standard and traversal through multiple nodes in the node graph is necessary in order to determine a subject's benefits under a given compliance standard. In some embodiments, 2, 3, 4, 5, 6, 7, or 8 or more nodes 222 must be traversed in order to determine a subject's benefits under a given compliance standard 226. In some embodiments, 10 or more nodes, 15 or more nodes, 25 or more nodes, or 50 or more nodes must be traversed in order to determine a subject's benefits under a given compliance standard 226.

Block 428. Referring to block 428, the method 400 includes using a message 1010 received subsequent to the respective first message 1010-1 in the respective communication channel 216. Accordingly, in some such embodiments, the message 1010 is received from the respective subject responsive to the automated human interface module 218 in order to progress the respective subject to another node 222 in the node graph 220 in accordance with satisfaction of the predetermined compliance question 224 associated with a first node 222-1. In some embodiments, the first node 222-1 is in the first subset of the plurality of nodes 222.

Block 430. Referring to block 430, in some embodiments, the using the message 1010 further includes identifying a respective node 222 in the first subset of nodes 222 as an initial node 222. In some such embodiments, the initial node 222 is used by the automated human interface module 218 as a starting position for progression of the respective subject within the node graph 220 based upon content of the message 1010 and/or the first respective message 101-1. Accordingly, the initial node 222 selected by the automated human interface module 218 is then utilized by the automated human interface module 218 to generate another message 1010 responsive to the message 1010 that is based on a corresponding predetermined compliance question 224 associated with the initial node 222.

Block 432. Referring to block 432, in some embodiments, the using the message 1010 further includes retrieving information from a prior text-based conversation associated with the respective subject. For instance, in some embodiments, the prior text-based conversation is stored in a corresponding user profile 212 associated with the respective subject, which allows for a future instance of the respective communication channel 216 between the respective subject and the automated human interface module 218 to have the most up-to-date information about the respective subject. In some embodiments the identifier for the conversation is specific to a subject and thus can be used to look for any other prior conversations with the subject and to automatically retrieve information from these prior conversations. In some embodiments, the prior text-based conversation is utilized by the automated human interface module 218 to determine one or more historical characteristics of the respective subject (e.g., one or more employment histories of the respective subject, one or more prior compliance standard 226 eligibilities of the respective subject, one or more utterance trends of the respective subject, one or more message trends of the respective subject, one or more sentiment characteristics of the respective subject, one or more intent characteristics of the respective subject, etc.), which help the automated human interface module 218 progress the respective subject in the node graph 220.

Block 434. Referring to block 434, in some embodiments, the using the message 1010 utilizes one or more models 208. For instance, in some such embodiments, the one or more models 208 receives as input, at least in part, the information provided by the respective subject through the message 1010 in the text-based conversation to identify another node 222 in the node graph 220. As another non-limiting example, in some embodiments, the one or more models 208 receives as input, at least in part, the information provided by the respective subject through the message 1010 in the text-based conversation to determine if the predetermined compliance question 226 associated with a node 222 is satisfied.

In some embodiments, the one or more models 208 include a text-to-speech model 208, a speech-to-text model 208, a translation model 208 (e.g., language translation model), or a combination thereof. In some embodiments, the speech-to-text model 208 provides speech recognition in order to obtain information from one or more utterances captured from the respective subject. In some embodiments, the speech recognition includes a feature extraction, which finds a set of parameters of utterances that have a correlation with speech. This set of parameters is then inputted to the model 208 by processing the acoustic waveform of the one or more utterances. In some embodiments, the speech-to-text model 208 is a language model that induces a probability of a word occurrence after a word sequence. In some embodiments, the language model includes one or more structural constraints (e.g., semantic and/or syntax based constraints) available in the language to generate a probability of occurrence. In some embodiments, the speech-to-text model 208 provides a text-based form of the one or more utterances. This text-based form of the one or more utterances is then utilized to progress the respective subject in the node graph 220. Additional details and information regarding speech models can be found at Trivedi et al., 2018, "Speech to text and text to speech recognition systems-Areview," IOSR J. Comput. Eng., 20(2), pg. 36-43, which is hereby incorporated by reference in its entirety for all purposes. For instance, referring briefly to FIG. 11, in some embodiments, the method 400 captures the one or more utterances by providing a mechanism 1110 that allows the respective subject to speak one or more utterances using a microphone that provides an audio interface between the respective subject and the client device 300, in which the one or more utterances is converted into a text-based message 1010 and/or processed as a waveform, and then communicated through the communication channel 216.

Block 436. Referring to block 436, in some embodiments, the one or more models 208 includes a support vector machine model 208, a logistic regression model 208, a naive Bayes model 208, a decision tree model 208, a nearest neighbor model 208, a neural network model 208, or a combination thereof.

Accordingly, in some embodiments, the one or more models 208 include a supervised learning model such as a decision tree model, a rule based model, a linear model (e.g., a SVM model, a neural network model, etc.), a probabilistic model (e.g., Naïve Bayes model, Bayesian model, max entropy model, etc.), or a combination thereof. In some embodiments, the models 208 include an unsupervised learning model and/or a semi-supervised (e.g., hybrid) model. Furthermore, in some embodiments, the one or more models 208 include a lexical based model such as a corpus based model (e.g., semantic based or statistical based) or a dictionary based model.

In some embodiments, the node graph 220 is implemented as a decision tree model 208, which is a supervised learning model that solves various regression and classification problems for the respective subject. The decision tree model 208 uses one or more branching nodes 222 associated with one or more predetermined compliance questions 225 (e.g., first subset of nodes 222) and one or more leaf nodes 222 (e.g., second subset of nodes 222) associated with a compliance standard 226. In some embodiments, evaluating a message 1010 using the decision tree model 208 by starting at an initial node 222 (e.g., base) of the node graph 220. An attribute of the initial node 222 is compared with the message, such as to evaluate a characteristic of the message. In some embodiments, to measure an uncertainty of a random variable (e.g., a text string or an ideogram of a text object in the message 1010), X is defined as an entropy, where:

$$H(X)=E_X[I(x)]=-\Sigma(p(x)\log p(x)).$$

Utilizing a decision tree model 208 requires less processing time for evaluating a message 1010. Furthermore, in some such embodiments, the decision tree model 208 is not affected if a non-linear relationship exists between different parameters of the evaluation.

In some embodiments, the neural network model 208 includes a convolutional neural network (CNN) and/or a region-convolutional neural network (RCNN). In some embodiments, the neural network model 208 includes an inter-pattern distance based (DistAI) model (e.g., a constructive neural network learning model).

Block 438. Referring to block 438 of FIG. 4C, in some embodiments, the using the message 1010 parses a portion of the message 1010 in accordance with a corresponding plurality of heuristic instructions associated with a first model 208-1 in the one or more models 208 into a respective classification in the form of a corresponding plurality of classification text strings. In some embodiments, the corresponding plurality of classification text strings of the respective classification collectively contains a portion, less than all, of the information of the message 1010.

For instance, in some embodiments, the conversation between the automated human interface module 218 and the respective subject is audio conversation. In some such embodiments the audio data is converted into a machine-readable format for the automated human interface module 218 to parse. Accordingly, in some embodiments, the audio data is transcribed into a text object, which allows information included in the audio data to be parsed by the one or more models 208. This transcribing allows for providing a characteristic of the message 1010 in audio form, which is particularly important for a respective subject that has a disability preventing use of a text-based conversation.

In some embodiments, the using the message 1010 applies a second model 208-2 in the one or more models 208 to a respective text string in the corresponding plurality of text strings to determine a characteristic of the respective text string. By determining the characteristic of the respective text string, the automated human interface module 218 evaluates the respective text string to progress the respective subject to another node 222 in the node graph 220 in accordance with a result of the evaluation.

For instance, as a non-limiting example, in some embodiments, the respective subject posts a message 1010 including a text object within a communication channel, that is processed by the one or more models using natural language processing (NPL) to identify a node 222 within the plurality of nodes 222 of the node graph 220 that best matches the text of the message received from the respective subject. For instance, in some embodiments, an analysis is performed based at least in part on lexicons (e.g., lists of words and the emotions they convey), sentiment analysis dictionaries (e.g., a dictionary containing information about the emotions or polarity expressed by words, phrases, or concepts), libraries (e.g., a library computing a set of prosodic and spectra features that supports emotion recognition), complex machine learning models (e.g., Naive Bayes, Support Vector Machine, Maximum Entropy), or a combination thereof. Accordingly, the text object is processed by the one or more models 208 in order to identify a best matching node 222 for the respective subject. However, the present disclosure is not limited thereto.

In some embodiments, the inter-pattern distance based model 208 includes a multi-layer network of threshold logic units (TLU) that provide a framework for pattern (e.g., characteristic, sentence or phrase) classification. Additionally, the DL model 208 determines an inter-pattern distance between each pair of patterns in a QAS training data set. This framework includes a potential to account for various factors including parallelism of data, fault tolerance of data, and noise tolerance of data. Furthermore, this framework provides representational and computational efficiency over disjunctive normal form (DNF) expressions. In some embodiments, a TLU implements an (N−1) dimensional hyperplane partitioning an N-dimensional Euclidean pattern space into two regions. In some embodiments, one TLU neural network sufficiently classifies patterns in two classes if the two patterns are linearly separable. Compared to other constructive learning models 208, the inter-pattern distance based model 208 uses a variant TLU (e.g., a spherical threshold unit) as hidden neurons. Additionally, the distance based model 208 determines an inter-pattern distance between each pair of patterns in a training data set, and determines the weight values for the hidden neurons. This approach differs from other models 208 that utilize an iterative classification process to determine the weights and thresholds for evaluating and providing a characteristic of a communication.

In some embodiments, the distance based model 208 utilizes one or more types of distance metrics to determine the inter-pattern distance between each pair of patterns. For instance, in some embodiments, the distance metric is based on those described in Duda et al., 1973, "Pattern Classification and Scene Analysis," Wiley, Print., and/or that described in Salton et al., 1983, "Introduction to Modern Information Retrieval," McGraw-Hill Book Co., Print, each of which is hereby incorporated by reference in their entirety. Table 1 provides various types of distance metrics of the distance based model 208.

Table 1. Exemplary distance metrics for the distance based model 208. In some embodiments, an analysis (e.g., sentiment analysis) is performed using a distance metric, such as a cosine similarity measure or dot product of one or more utterances of the respective subject against each statement in a list of statements that are deemed to be characteristic of a predetermined sentiment. In some embodiments, the sentiment analysis is based on those described in Duda et al., 1973, "Pattern Classification and Scene Analysis," Wiley, Print., and/or that described in Salton et al., 1983, "Introduction to Modern Information Retrieval," McGraw-Hill Book Co., Print, each of which is hereby incorporated by reference in their entirety. Consider $X^p=[X_1^p, \ldots, H_n^p]$ and $X^q=[X_1^p, \ldots, X_n^q]$ to be two pattern vectors (e.g., where one of the pattern vectors is all or a portion of a response by a user to a question and the other vector is one of a plurality of references vectors, where each such reference vector is labeled with a node in the node-graph that is associated with the reference vector). Also consider $\max_i$ and $\min_i$ to be the maximum value and the minimum value of an $i^{th}$ attribute of the patterns in a data set (e.g., a text object and/or a text string), respectively. The distance between $X^p$ and $X^q$ is defined as follows for each distance metric:

| Type | Distance Metric |
|---|---|
| Euclidean | $d(X^p, X^q) = \sqrt{\sum_{i=1}^{n}(X_i^p - X_i^q)^2}$ |
| Manhattan | $d(X^p, X^q) = \sum_{i=1}^{n}|X_i^p - X_i^q|$ |
| Maximum Value | $d(X^p, X^q) = \operatorname{argmax}_i |X_i^p - X_i^q|$ |
| Normalized Euclidean | $d(X^p, X^q) = \sqrt{\frac{1}{n}\sum_{i=1}^{n}\left(\frac{X_i^p - X_i^q}{\max_i - \min_i}\right)^2}$ |
| Normalized Manhattan | $d(X^p, X^q) = \frac{1}{n}\sum_{i=1}^{n}\frac{|X_i^p - X_i^q|}{\max_i - \min_i}$ |
| Normalized Maximum Value | $d(X^p, X^q) = \operatorname{argmax}_i \frac{|X_i^p - X_i^q|}{\max_i - \min_i}$ |
| Dice Coefficient | $d(X^p, X^q) = 1 - \frac{2\sum_{i=1}^{n} X_i^p X_i^q}{\sum_{i=1}^{n} X_i^{p^2} + \sum_{i=1}^{n} X_i^{q^2}}$ |
| Cosine coefficient | $d(X^p, X^q) = 1 - \frac{\sum_{i=1}^{n} X_i^p X_i^q}{\sqrt{\sum_{i=1}^{n} X_i^{p^2} \cdot \sum_{i=1}^{n} X_i^{q^2}}}$ |
| Jaccard coefficient | $d(X^p, X^q) = 1 - \frac{\sum_{i=1}^{n} X_i^p X_i^q}{\sum_{i=1}^{n} X_i^{p^2} + \sum_{i=1}^{n} X_i^{q^2} - \sum_{i=1}^{n} X_i^p X_i^q}$ |

Additional details and information regarding the distance based model 208 can be learned from Yang et al., 1999, "DistAl: An Inter-pattern Distance-based Constructive Learning Algorithm," Intelligent Data Analysis, 3(1), pg. 55.

Block 440. Referring to block 440, in some embodiments, the parsing and/or the applying translates the message 1010 from a first language to a second language different than the first language, such as from French to English. In some embodiments, the translating includes determining a synonym of a word in the text object in the first language and/or the second language. Accordingly, by translating the first language that is native to the message 1010 received by the respective user, the automatic human interface module 218 is allowed to engage with the respective user independent of the native language the respective user communicates through.

Block 442. Referring to block 442, in some embodiments, the message 1010 received subsequent the respective first message 1010-1 includes information offered by the respective subject, such as optional and/or required information in order to progress the subject in the node graph 220. In some embodiments, the message 1010 received subsequent the respective first message 1010-1 includes information such as a name of the respective subject, a proposed absence start date of the respective subject (e.g., proposed absence start date of "Start Jun. 11, 2022" of FIG. 12), a proposed absence end date of the respective subject (e.g., proposed absence end date of "Return to Work ("RTW")" Oct. 8, 2022" of FIG. 13), a reason for a proposed absence of the respective subject (e.g., second message 1010-2 of FIG. 10 describing "Adding to my family,"), an absence status category of the proposed absence of the respective subject (e.g., second message 1010-2 of FIG. 11 describing "Birth,"), or a combination thereof. However, the present disclosure is not limited thereto.

Block 444. Referring to block 444, in some embodiments, prior to receiving the message, the method 400 determines whether sufficient information has been received by the respective subject in the text-based conversation, in which the sufficient information is utilized to determine that the respective subject is deemed to be eligible with the compliance standard 226. In some such embodiments, responsive to determining that the sufficient information has not been received by the respective subject, the automated human interface module 218 engages the conversation to prompt the respective subject to submit further information in accordance with a corresponding predetermined compliance question 225 associated with another node 222 in the plurality of nodes 222 of the node graph 220.

As an example, consider the automated human interface module 218 is tasked with determining if a first requirement 228-1 of a first compliance standard 226-1 is satisfied. Further suppose in this example that the first requirement 228-1 includes an exception (e.g., the first requirement 228-1 does not apply to a subject if the subject is at least 65 years of age). Accordingly, in some embodiments, the exception is processed by routing the progress of the respective subject 222 to another node 222 that will provide an appropriate message 1010 configured to elicit a responsive message from the respective user to obtain the sufficient information, such as an age of the respective subject.

Block 446. Referring to block 446, in some embodiments, prior to receiving the message 1010, the automated human interface module 218 loads information regarding one or more prior text-based conversations with the respective subject (e.g., obtains information from a user profile 212 corresponding to the respective subject) in a communication channel 216 in the plurality of communication channels 216. Accordingly, the automated human interface module 218 use the information regarding the one or more text-based conversations to progress the respective subject in the node graph 220.

Thus, in some embodiments, the automated human interface module 218 provides the option of loading the details of a prior conversation that the respective subject engaged in. For instance, in some embodiments, the respective subject completed a particular conversation (e.g., received a corresponding report 1210), but having some or all of the details of the particular conversation is useful. As a non-limiting example, consider when the respective subject initiated a prior conversation to determine eligibility for a fifth compliance standard 226-5, in which the prior conversation occurred within the past two weeks. Historical data associated obtained from the corresponding user profile indicates that the respective subject was not deemed eligible for the fifth compliance standard 226 (e.g., the respective subject did not satisfy a requirement 228 of the fifth compliance standard 226 or failed to provide a responsive message 1010 to a predetermined compliance question 224 associated with the fifth compliance standard 226). Thus, in this example, the automated human interface module 218 selects a node 222 associated with the requirement 228 of the fifth compliance standard 226 or the predetermined compliance question 224 associated with the fifth compliance standard 226. However, the present disclosure is not limited thereto. Thus, in some embodiments, the automated human interface module 218, for some types of conversations, the historical data is automatically loaded from the corresponding user profile. In some embodiments, the respective subject is given the option to load the historical data from one or more prior conversations the respective subject engaged in. In some embodiments, the automated human interface module 218 provides to the respective subject an offer to load historical data. However, the present disclosure is not limited thereto.

Block 448. Referring to block 448 of FIG. 4D, the method 400 includes repeating the using the message 1010 when the subject remains in a node 222 in the first subset of nodes 222. Accordingly, since the subject remains in the first subset of nodes 222, the subject has not yet progressed to a respective node in the second subset of nodes 222. Accordingly, this repeating continues until the respective subject progresses to the respective node 222 in the second subset of nodes 222. Through this progression from the node 222 in the first subset of nodes 222 to the respective node 222 in the second subset of nodes 222, the respective subject is deemed to satisfy at least a subset of a plurality of requirements 228 in the corresponding plurality of requirements 228 of a compliance standard 226 associated with the respective node 222 in the second subset of nodes. The subset of the plurality of requirements includes at least a first requirement to receive a corresponding benefit from the compliance standard associated with the respective node in the second subset of nodes.

Block 450. Referring to block 450, in some embodiments, the compliance standard 226 is a performance standard, a maternity leave standard, a short-term disability standard, a longer-term disability standard, a sick leave standard, a fostering or adopting standard, an employer program standard, a surrogacy standard, a parental standard, a pre-natal leave standard, a newborn baby bonding leave standard, a caregiver leave standard, a military service leave standard, a paid time off (PTO) leave standard, a vacation standard, or a combination thereof. One of skill in the art will appreciate that a compliance standard 226 of the present disclosure is not limited thereto.

In some embodiments, the corresponding benefit of the compliance standard 226 is at least a total number of days the respective subject is entitled to be absent from work within a period of time. In some embodiments, the period of time is a day, a week, two weeks, a month, a fiscal quarter, a calendar year, a decade, or the like.

Block 452. Referring to block 452, in some embodiments, the total number of days is a parallel representation or a series representation for the compliance standard. For instance, in some embodiments, the parallel representation provides the respective subject with information for two or more corresponding benefits of two or more compliance standards 226 that occur at the same time. In some embodiments, the parallel representation allows for an overlap between a first benefit of a first compliance standard 226-1 and a second benefit of a second compliance standard 226-2. In some embodiments, the series representation does not allow for such overlap. However, the present disclosure is not limited thereto. Accordingly, the systems and methods of the present disclosure provide a visual depiction of each benefit for a compliance standard 226 that is appliable to a current situation of the respective subject, and how one or more benefits and/or compliance standards 226 interact consecutively (e.g., in series) or concurrently (e.g., in parallel).

Figure 14:
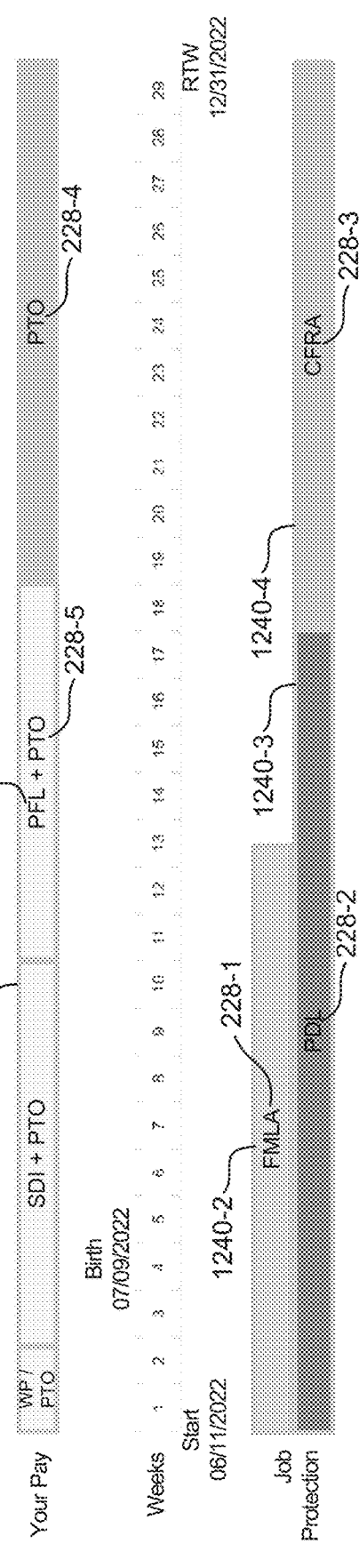
FIG. 14 illustrates a user interface of a display of a client device that allows an end-user to review a corresponding report including a graphical chart, in accordance with an exemplary embodiment of the present disclosure.

For instance, referring briefly to FIG. 14, a first portion of the graphical chart 1220 provides a visualization of employment protection for the respective subject described as a "Job Protection." From week 1 through week 13, a first compliance standard 226-1 associated with the FMLA is provided in parallel with a second compliance standard 226-2 associated with paid disability leave (PDL). In some embodiments, this parallelism of the first compliance standard 226-1 and the second compliance standard 226-2 means that the subject is allowed to utilize one of the first compliance standard 226-1 or the second compliance standard 226-2, but not both. Furthermore, the second compliance standard 226-2 and a third compliance standard 226-3 associated with a California Family Rights Act (CFRA) are provided in series, such that a second benefit of the second compliance standard and a third benefit of the third compliance standard do not overlap, meaning the subject is allowed to utilize both of the third compliance standard 226-3 and the second compliance standard 226-2.

In some embodiments, a color of visualization of a respective data plot is configured based on a characteristic of a compliance standard 226 associated with the respective data plot. For instance, in some embodiments, the color of visualization of the respective data plot is second compliance standard administrated by a state government is visualized with a second color different than the first color, a third compliance standard administrated by an employer of the respective subject is visualized with a third color, etc. However, the present disclosure is not limited thereto. As a non-limiting example, in some embodiments, the characteristic of the compliance standard 226 is a type of benefit provided by the compliance standard (e.g., a respective benefit for compensation protection is visualized as the first color, a respective benefit for employment protection is visualized as the second color, a respective benefit for both compensation protection and employment protection is visualized as the third color, etc.).

Block 454. Referring to block 454, the method 400 includes generating a corresponding report (e.g., report 1210 of FIG. 12, report 1210 of FIG. 13, report 1210 of FIG. 14, report 1210 of FIG. 15, report 1210 of FIG. 16, etc.). The corresponding report is generated for the respective subject responsive to progression to the respective node 222 in the second subset of nodes 222. Accordingly, in some embodiments, the corresponding report includes a result of an expected availability of the corresponding benefit for the respective subject in accordance with of the compliance standard 226 associated with the respective node 222 in the second subset of nodes 222. In this way, the corresponding report 1210 provides a dynamic representation of subject-specific information based on a compliance standard 226, eligibility of the respective subject for the compliance standard 226, eligibility of the respective entity that employs the respective subject for the compliance standard 226, or a combination thereof. Furthermore, in some embodiments, the corresponding report 1210 includes information provided by the subject in the text-based conversation in each instance of the using the message. Accordingly, the corresponding report 250 of the present disclosure allows for displaying subject specific information obtained for the respective subject including one or more evaluations of the respective subject in a concise and comprehensive format. This is advantageous because complexities for the corresponding plurality of requirements for a respective compliance standard 226 are evaluated in a concise corresponding report 1210, allowing for the respective subject to digest complicated information associated with the respective compliance standard 226 without difficulty or need for reference materials.

Block 456. Referring to block 456, in some embodiments, the corresponding report 1210 includes a graphical chart (e.g., graphical chart 1220 of FIG. 12, graphical chart 1220 of FIG. 13, graphical chart 1220 of FIG. 14, graphical chart 1220 of FIG. 15, graphical chart 1220 of FIG. 16, etc.). In some embodiments, the corresponding report 1210 includes two more graphical charts 1220 (e.g., first graphical chart 1220-1 of FIG. 13 and second graphical chart 1220-2 of FIG. 16), three or more graphical charts 1220, or the like. Accordingly, the two more graphical charts 1220 provide information that supplement or augment each other. In some embodiments, a graphical user interface a client device 300 for displaying the corresponding report 1210 is restricted to displaying one respective graphical chart 112 at a time (e.g., limited by a display configuration of the respective graphical chart 1220 and/or the client application 306 of the client device 300), allowing the respective to focus and comprehend the information provided by the first graphical chart 1220-1 without distraction of the second graphical chart 1220-2. However, the present disclosure is not limited thereto.

Figure 12:
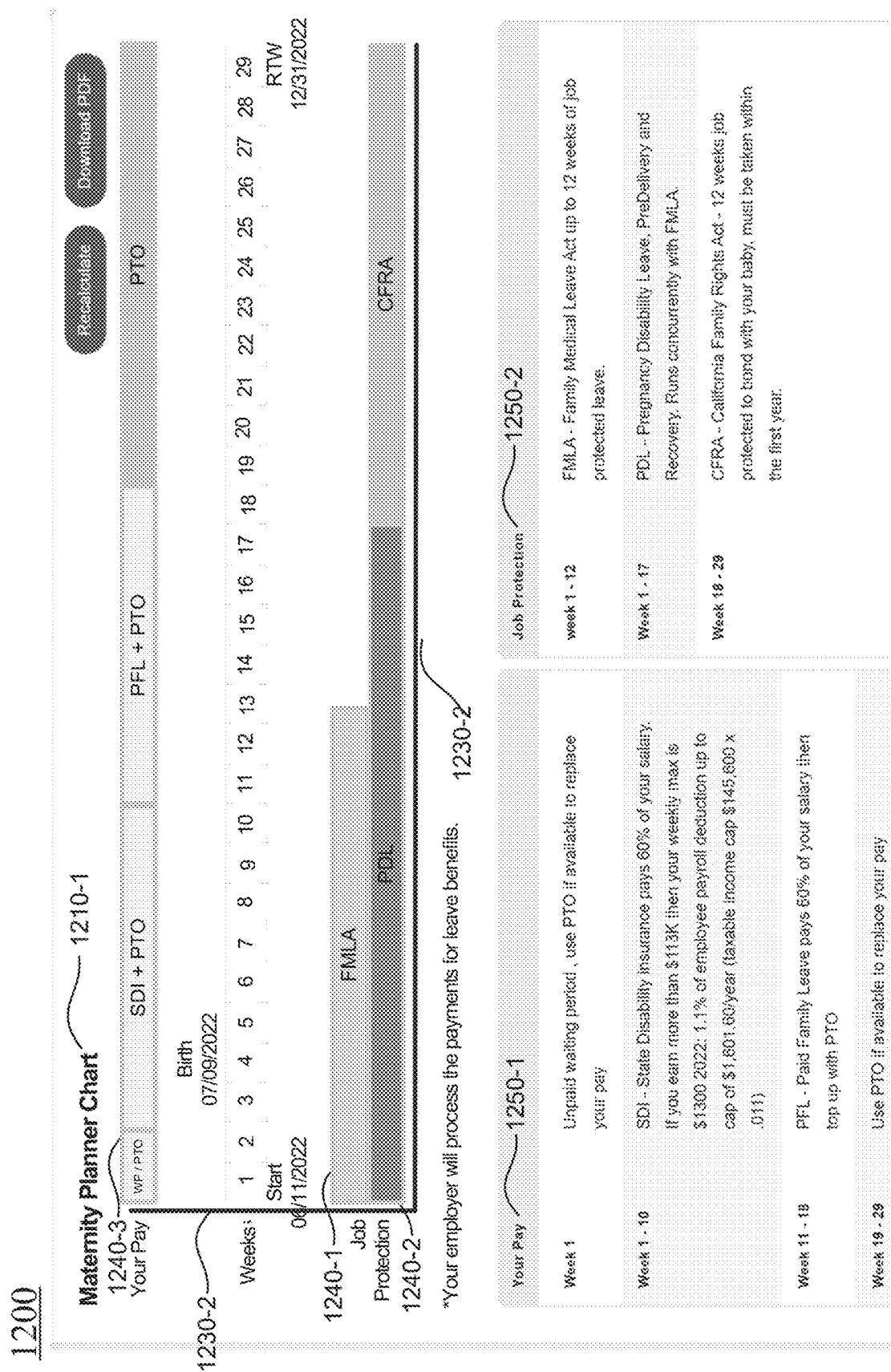
FIG. 12 illustrates a user interface of a display of a client device that allows an end-user to review a corresponding report generated for a respective subject, in accordance with an exemplary embodiment of the present disclosure.
Figure 13:
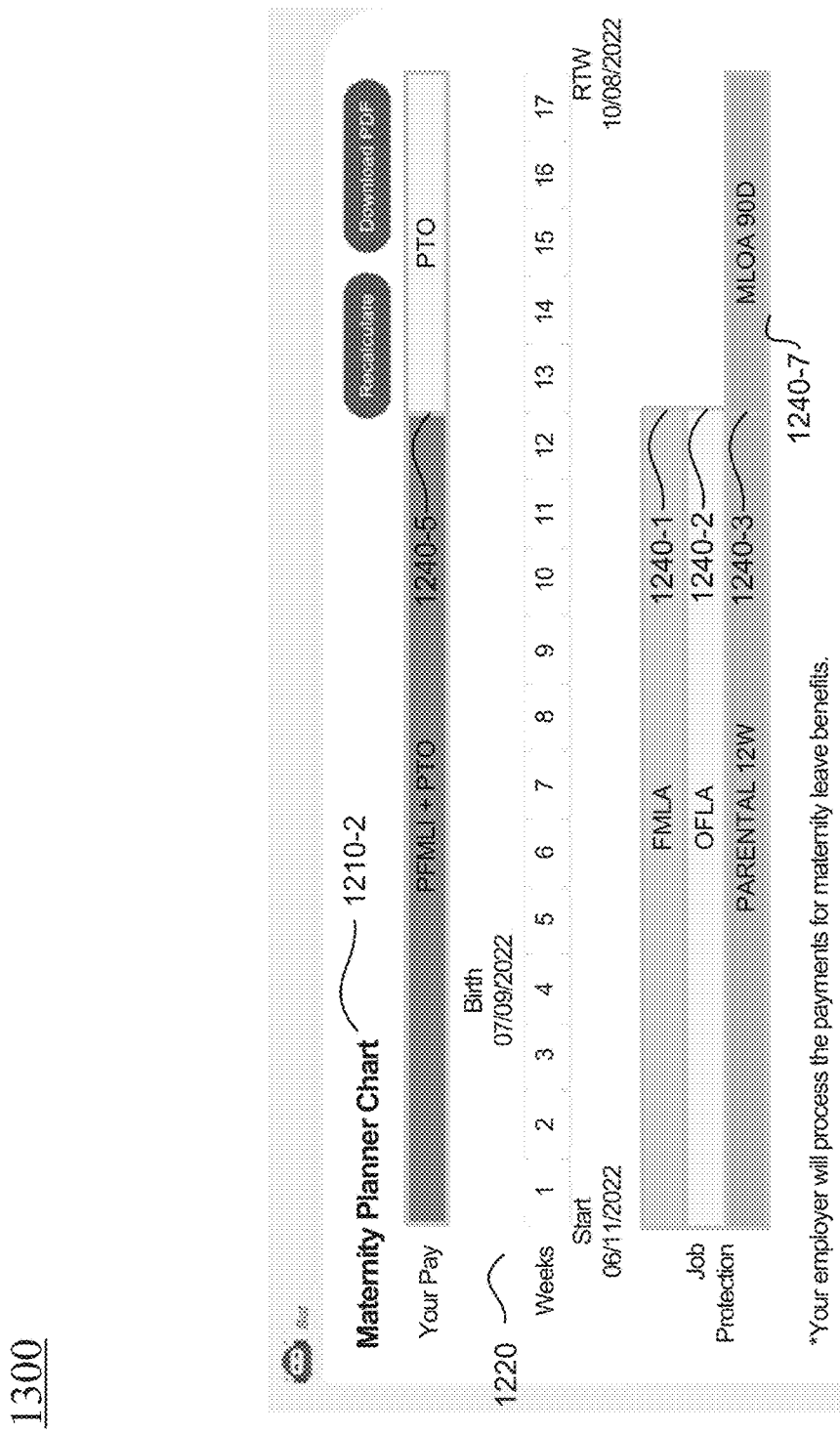
FIG. 13 illustrates another user interface of a display of a client device that allows an end-user to review a corresponding report generated for a respective subject, in accordance with an exemplary embodiment of the present disclosure.

The graphical chart 1220 includes a first axis (e.g., first axis 1230-1 of FIG. 12). Each axis 1230 is a feature of the graphical chart 1220 that extends in a single direction along which information is presented and/or conveyed through a dimension of the graphical chart. For instance, in some embodiments, the first axis 1230-1 includes a first segmentation based on a period of time, which allows the respective subject to visualize relative positions between features (e.g., data plots 1240 on the graphical chart 1220). In some embodiments, the information conveyed for a respective axis 1230 is conveyed in a first dimension. In some embodiments, the information conveyed with for the respective axis 130 is conveyed in the first dimension and restricted to the first dimension. As a non-limiting example, in some embodiments, the first segmentation is based on a number of weeks. For instance, referring briefly to FIG. 13, a first axis 1230-1 of the graphical chart 1220 provides a first segmentation based on a 17 week period of time. As another non-limiting example, referring briefly to FIG. 12, a first axis 1230-1 of the graphical chart 1220 provides a first segmentation based on a 29 week period of time. In some embodiments, the period of time is based on when a corresponding first benefit of a first compliance standard 226-1 begins, when the corresponding first benefit of the first compliance standard 226-1 ends, when a corresponding second benefit of a second compliance standard 226-2 starts, when the corresponding second benefit of the second compliance standard 226-2 ends, or a combination thereof. However, the present disclosure is not limited thereto.

In some embodiments, the graphical chart 1220 includes a second axis (e.g., second axis 1230-2 of FIG. 12). In some embodiments, the second axis 1230-2 is orthogonal to the first axis 1230-1. For instance, as illustrated by the graphical chart 1220 of FIG. 12, the first axis 1230-1 and the second axis 1230-2 intersect at a right angle, at substantially a right angle, or will intersect at said angles if either the first axis 1230-1 or the second axis 1230-2 were projected a further distance. In this way, the graphical chart 1220 illustrates one or more quadrants formed by the first axis 1230-1 and the second axis 1230-2. However, the present disclosure is not limited thereto. As used here, the term "substantially" means within five degrees of a right angle.

In some embodiments, the corresponding report 1210 is configured in accordance with a display 378 of the client device 300 associated with the respective subject. For instance, in some such embodiments, the first axis 1230-1 is parallel or substantially parallel to a longitudinal axis of the display 378. In some such embodiments, a first length of the first axis 1230-1 is greater than or equal to a second length of the second axis 1230-2. By having the length of the first axis 1230-1 greater than or equal to the second length of the second axis 1230-2, the graphical chart 1220 displays in a landscape orientation on the display 378. Further still, in some embodiments, the second axis 1230-1 is parallel or substantially parallel to the longitudinal axis of the display 378. In some such embodiments, the first length of the first axis 1230-1 is less than or equal to the second length of the second axis 1230-2. By having the length of the first axis 1230-1 less than or equal to the second length of the second axis 1230-2, the graphical chart 1220 displays in a portrait orientation on the display 378.

In some embodiments, the second axis 1230-2 includes a second segmentation that is based on a categorization of the compliance standard 226. For instance, referring briefly to FIG. 12, a second axis 1230-2 includes a first segment based on a first subset of compensation compliance standards 226 (e.g., "Your Pay" of graphical chart 1220 of FIG. 12), a second segment based on a second subset of compliance standards 226 (e.g., "Job Protection" of graphical chart 1220 of FIG. 12). In some embodiments, the second segmentation is based on a number of classifications of a corresponding benefit of the one or more compliance standards of the corresponding report 1210. However, the present disclosure is not limited thereto. In some embodiments, a first classification of the corresponding benefit of the one or more compliance standards 226 of the corresponding report 1210 is an unpaid leave, job-protected time away from work (e.g., FMLA compliance standard 226). In some embodiments, a second classification of the corresponding benefit of the one or more compliance standards 226 is a paid family or medical leave, which provide a right to pay (e.g., in a form of a partial wage replacement) when a subject is not working through a social insurance service. In some embodiments, a third classification of the corresponding benefit of the one or more compliance standards 226 is a paid sick time leave, which provide rights to short period of time away from work when the subject or the family of the subject is sick, injured, or seeking medical treatment. In some embodiments, a fourth classification of the corresponding benefit of the one or more compliance standards 226 is a specific, standalone leave right in connection with expanding a family, such as pregnancy, childbirth, or becoming a parent, which is typically an unpaid leave.

In some embodiments, a respective axis 1230 is displayed as a visible feature of the graphical chart 1220. For instance, a respective second axis 1230-2 of FIG. 12 is displayed as a bar shaped feature of the graphical chart 1220. In some embodiments, the respective axis 1230 is hidden feature of the graphical chart 1220 (e.g., respective first axis 1230-1 of FIG. 13).

In some embodiments, the graphical chart 1220 includes one or more data plots 1240. In some embodiments, each data plot 1240 is independently located relative to a position on the first axis 1230-1 or the second axis 123-2. Each respective data plot 1240 in the one or more data plots 1240 represents a compliance standard 226. For instance, in some embodiments, a respective data plot 1240 defines at least a number of days the respective subject is entitled to be absent from work within the period of time. In some embodiments, collectively, the one or more data plots define a total number of days the respective subject is entitled to be absent from work within the period of time. However, the present disclosure is not limited thereto.

In some embodiments, a respective data plot 1240 is an intractable feature displayed by the graphical chart 1220. For instance, in some embodiments, in accordance with an interaction by the respective subject with the respective data plot 1240, the corresponding report 1210 provides information that supplements the respective data plot 1240, augments the respective data plot 1240, is auxiliary too the respective data plot 1240, or a combination thereof, such as by displaying a respective listing portion (e.g., listing portion 1250 of FIG. 12) of the corresponding report 1210. In some embodiments, the respective listing portion is a header portion and/or a footer portion of the corresponding report 1210.

In some embodiments, the graphical chart 1220 provides a bar chart, a text table, a scatter plot, a line graph, a map, or a combination thereof. For instance, in some embodiments, the text table is utilized to visualize numerical values as text, such as a particular value for each row of the text table. In some embodiments, the bar chart charts provides a dimensional (e.g., length, position) comparison along a common scale. In some embodiments, the scatter plot provides a visualization of a relationship between two or more quantitative dimensions plotted against each other on the first axis 1230-1 and the second axis 1230-2. In some embodiments, the line graph provides a visualization of quantitative data against a temporal variable. However, the present disclosure is not limited thereto.

Block 458. Referring to block 458, in some embodiments, the graphical chart 1220 includes a first listing portion (e.g., listing portion 1260-1 of FIG. 15) that provides a description of compensation protection provided for the respective subject by the compliance standard 226. In some embodiments, a respective listing portion of the graphical chart 1220 is displayed beneath the first axis 1230-1 and/or the second axis 1230-2, such as first listing 1250-1 of FIG. 12. In some embodiments, the description of compensation protection provided by the respective subject includes an explanation of the compliance standard 226, a corresponding benefit of the compliance standard 226, a requirement 228 of the compliance standard 226, or a combination thereof that enable the compensation protection benefit provided for the respective subject. For instance, referring briefly to FIG. 15, in some embodiments, the first listing portion 1260-1 of the corresponding report 1210 describes that in a proposed first week of leave for the respective subject, a first compliance standard 226-1 of PTO is utilized for compensation with an explanation for an unpaid waiting period exception requirement 228-1. Moreover, for weeks 1-10, a second compliance standard 226-2 for State disability insurance is expected to cover 60% of the compensation of the respective subject if the respective subject satisfies the second requirement 228-2 of the second compliance standard 226-2. However, the present disclosure is not limited thereto.

Block 460. Referring to block 460 of FIG. 4E, in some embodiments, the graphical chart 1220 includes a second listing portion 1260-2 that provides a description of employment protection provided for the respective subject by the compliance standard 226. In some embodiments, the description of employment protection benefit provided by the respective subject includes an explanation of the compliance standard 226, a corresponding benefit of the compliance standard 226, a requirement 228 of the compliance standard 226, or a combination thereof that enable the employment protection provided for the respective subject.

Block 462. Referring to block 462, in some embodiments, the graphical chart 1220 includes a third listing 1250-3 that provides a log for displaying at least each predetermined compliance question 224 provided in the respective communication channel 216 and the corresponding message provided by the respective subject responsive to each predetermined compliance question 224. For instance, referring briefly to FIG. 16, the third listing portion 1250-3 provides a log of each predetermined compliance question provided in the respective communication channel.

In some embodiments, the log provides a summary overview of how end users moved through the automated human interface module 218 conversations. In some embodiments, the log provides a summary report for each node 222 through which any end users exited the automated human interface module 218. The report provides a breakdown of the specific predetermined compliance questions 224 that were provided to the respective subject and one or more responsive messages provided by the respective subject within the communication channel 216.

Block 464. Referring to block 464, in some embodiments, the graphical chart 1220 includes a first section configured to display a timestamp associated with engagement in the respective text-based conversation and/or an informative notice associated with the result of the expected availability of the corresponding benefit for the respective subject. By providing the timestamp associated with engagement in the respective text-based conversation and/or the informative notice associated with the result of the expected availability of the corresponding benefit for the respective subject, the corresponding report 1210 provides a temporal reference for when the result was provided for the respective subject, should the respective subject review the corresponding report 1210 at a future time. For instance, referring briefly to FIG. 14, a first section that is header section of the corresponding report 1210 includes a timestamp 1410 that describes, "Report generated on—May 10, 2022 at 6:02 AM PT," and an informative notice 1420 associated with the result of the expected availability of the corresponding benefit for the respective subject that describes, "Important Notice: This tool provides an estimate for planning purposes only. The results do not represent approval of your possible leave and benefits." However, the present disclosure is not limited thereto.

Block 466. Referring to block 466, in some embodiments, the expected availability of the compliance standard for the respective subject is determined based on a period of time that encompasses a contiguous or intermittent present portion and a contiguous or intermittent future portion. In other words, in some embodiments, the expected availability for the respective subject detail information for a current period of time plus and/or minus a second period of time (e.g., a calendar shows a current period of April while providing absentee information for the months of January through March as well as May through December).

Block 468. Referring to block 468, the method 400 includes communicating the corresponding report 1210 through the respective communication channel 216 for review by the respective subject. Accordingly, by communicating the corresponding report 1210 through the respective communication channel 216 for review by the respective subject, the respective subject is allowed to visualize the corresponding report 1210 displayed on the client device 300. For instance, in some embodiments, the method 400 includes display, on the display 378, in a graphical user interface, of the client device 300 the corresponding report 1210. This visualization occurs without a need to display information related to a respective requirement 228 of the compliance standard 226. In this way, the respective subject is enabled to comprehend the expected availability of the corresponding benefit of the compliance standard without having a mental burden.

Accordingly, the systems and methods of the present disclosure allow for the respective subject to determine eligibility for an unlimited number of compliance standards 226, such as 10 or more compliance standards 226, 100 or more compliance standards 226, 1000 or more compliance standards 226, 5,000 or more compliance standards 226 or 100,000 or more compliance standards 226. Moreover, in some embodiments, the systems and methods of the present disclosure allow for highly customizable explanation of these compliance standards 226 and the language that is used to explain the requirements that the respective subject must satisfy in order to receive a corresponding benefit of a compliance standard 226. Furthermore, in some embodiments, the systems and methods of the present disclosure allow for the creation of custom predetermined compliance questions to determine if the respective subject satisfies a respective requirement of the compliance policy. For instance, in some embodiments, an employer that has multiple different union groups each with different applicable compliance standards 226, the systems and methods of the present disclosure allow for adding customized predetermined compliance questions 224 to a node 222 based on the different applicable compliance standards 226 that are applicable to a given employee or employee group. Furthermore, in some embodiments, the systems and methods of the present disclosure allow the respective subject to customize the corresponding report in terms of service expressed as time served, duration of leave allowed by the compliance standard, or a combination thereof. For instance, in some embodiments, the systems and methods of the present disclosure allow the respective subject to customize the corresponding report in terms of continuous period of time of leave, intermittent period of time of leave (e.g., in increments of time such as 1 day, 5 days, etc.). Additionally, in some embodiments, the systems and methods of the present disclosure provide for an ability for the respective subject to login to save answers (e.g., messages response to a predetermined compliance question 224) and, optionally, edit the answers. Moreover, in some embodiments, the systems and methods of the present disclosure provide an ability for the respective subject to provide consent for the automated human interface module 218 to seek and retrieve PII data and more information, such as PTO balances, salary, tenure, prior leave information, payroll accrued under state/local sick laws, and the like.

Furthermore, in some embodiments, the systems and methods of the present disclosure provide a log for when the respective subject utilizes the systems and methods of the present disclosure, such as which respective user logged in, when the respective user logged in, how many times the respective user used the systems and methods of the present disclosure in a time-period, when the systems and methods of the present disclosure were utilized by the respective subject, and the like.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain instructions for operating the user interfaces disclosed herein and described with respect to the Figures. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A computer system comprising:
one or more processing units and a memory coupled to at least one processing unit of the one or more processing units, the memory storing at least one program for execution by the at least one processing unit, the at least one program comprising one or more instructions that:
for each respective subject in a plurality of subjects, wherein the plurality of subjects comprises more than 100 subjects:
(A) receives a respective first message, in electronic form, from the respective subject to engage in a respective text-based conversation through a respective communication channel in a plurality of communication channels, wherein the respective first message comprises a respective first application programming interface token that uniquely identifies the respective text-based conversation;
(B) responsive to the respective first message, engages an automated human interface module with the respective subject through the text-based conversation in the respective communication channel, wherein:
the automated human interface module comprises a node graph comprising a plurality of nodes,
each respective node in the plurality of nodes is connected to at least one other node in the plurality of nodes,
each respective node in at least a first subset of the plurality of nodes is associated with at least one predetermined compliance question, and
a second subset of the plurality of nodes corresponds to a plurality of distinct compliance standards, each distinct compliance standard of the plurality of distinct compliance standards having a corresponding benefit, each respective node in the second subset of the plurality of nodes is associated with a respective compliance standard in the plurality of distinct compliance standards, and the respective compliance standard comprising a corresponding plurality of requirements for compliance with the respective compliance standard;
(C) uses a message received subsequent to the respective first message in the respective communication channel and responsive to the automated human interface module to progress the respective subject to another node in the node graph in accordance with satisfaction of the predetermined compliance question associated with a first node, wherein the first node is in the first subset of the plurality of nodes;
(D) repeats the using (C), when the respective subject remains in a node in the first subset of nodes, until the respective subject progresses to a respective node in the second subset of nodes, wherein the respective subject, through progression to the respective node in the second subset of nodes, is deemed to satisfy at least a subset of a plurality of requirements in the corresponding plurality of requirements of a compliance standard associated with the respective node in the second subset of nodes, wherein the subset of the plurality of requirements comprises at least a first requirement to receive the corresponding benefit from the compliance standard associated with the respective node in the second subset of nodes;
(E) generates, responsive to progression to the respective node in the second subset of nodes, a corresponding report comprising a result of an expected availability of the corresponding benefit for the respective subject in accordance with the compliance standard associated with the respective node in the second subset of nodes and at least information provided by the respective subject in the text-based conversation in each instance of the using (C); and
(F) communicates the corresponding report through the respective communication channel for review by the respective subject.

2. The computer system of claim 1, wherein the compliance standard associated with the respective node is specific to a respective government institution or service, a respective entity that employs the respective subject, or both.

3. The computer system of claim 1, wherein the plurality of communication channels comprises 10 or more communication channels, 50 or more communication channels, 250 or more communication channels, 2,000 or more communication channels, or 10,000 or more communication channels.

4. The computer system of claim 1, wherein the plurality of nodes comprises 50 or more nodes, 100 or more nodes, 500 or more nodes, 1,000 or more nodes, or 5,000 or more nodes.

5. The computer system of claim 1, wherein each node in the second subset of nodes is associated with at least two nodes in the first subset of nodes.

6. The computer system of claim 1, wherein the node graph is a non-binary node graph.

7. The computer system of claim 1, wherein the using (C) further comprises identifying a respective node in the first subset of nodes as an initial node.

8. The computer system of claim 1, wherein the using (C) further comprises retrieving information from a prior text-based conversation associated with the respective subject.

9. The computer system of claim 1, wherein the automated human interface module comprises an audio and voice response module.

10. The computer system of claim 1, wherein the using (C) utilizes one or more models that receives as input, at least in part, the information provided by the respective subject in the text-based conversation to identify another node in the node graph and/or to determine if the predetermined compliance question is satisfied.

11. The computer system of claim 10, wherein the one or more models comprises a support vector machine model, a logistic regression model, a naive Bayes model, a decision tree model, a nearest neighbor model, a neural network model, or a combination thereof.

12. The computer system of claim 10, wherein the using (C):
  parses a portion of the message in accordance with a corresponding plurality of heuristic instructions associated with a first model in the one or more models into a respective classification in the form of a corresponding plurality of classification text strings, wherein the corresponding plurality of classification text strings of the respective classification collectively contains a portion, less than all, of the information of the message, and
  applies a second model in the one or more models to a respective text string in the corresponding plurality of text strings to determine a characteristic of the respective text string.

13. The computer system of claim 12, wherein the parsing and/or the applying translates the message from a first language to a second language different than the first language.

14. The computer system of claim 1, wherein a predetermined compliance question in the at least one predetermined compliance question is configured by an administrator associated with a respective entity that employs the respective subject.

15. The computer system of claim 1, wherein the message received subsequent the respective first message comprises a name of the respective subject, a proposed absence start date of the respective subject, a proposed absence end date of the respective subject, a reason for a proposed absence of the respective subject, an absence status category of the proposed absence of the respective subject, or a combination thereof.

16. The computer system of claim 1, wherein the compliance standard associated with the respective node is defined, at least in part, by a federal government entity or service, a state government entity or service, a county government entity or service, a municipal government entity or service, or the respective entity that employs the respective subject.

17. The computer system of claim 1, wherein:
  the compliance standard associated with the respective node is a performance standard, a maternity leave standard, a short-term disability standard, a longer-term disability standard, a sick leave standard, a fostering or adopting standard, an employer program standard, a surrogacy standard, a parental standard, a pre-natal leave standard, a newborn baby bonding leave standard, a caregiver leave standard, a military service leave standard, a paid time off (PTO) leave standard, a vacation standard, or a combination thereof, and
  the corresponding benefit of the respective compliance standard is at least a total number of days the respective subject is entitled to be absent from work within a period of time.

18. The computer system of claim 1, wherein the corresponding report comprises a graphical chart comprising:
  a first axis comprising a first segmentation based on a period of time,
  a second axis comprising a second segmentation based on a categorization of the compliance standard, and
  one or more data plots defining at least a total number of days the respective subject is entitled to be absent from work within the period of time.

19. The computer system of claim 18, wherein the total number of days is a parallel representation or a series representation for the compliance standard associated with the respective node.

20. The computer system of claim 1, wherein the corresponding report comprises a graphical chart comprising a first listing portion that provides a description of compensation provided for the respective subject by the compliance standard associated with the respective node.

21. The computer system of claim 1, wherein the corresponding report comprises a graphical chart comprising a second listing portion that provides a description of employment protection provided for the respective subject by the compliance standard associated with the respective node.

22. The computer system of claim 1, wherein the corresponding report comprises a graphical chart comprising a third listing that provides a log for displaying at least each predetermined compliance question provided in the respective communication channel.

23. The computer system of claim 1, wherein the corresponding report comprises a graphical chart comprising a first section configured to display (i) a timestamp associated with engagement in the respective text-based conversation and/or (ii) an informative notice associated with the result of the expected availability of the corresponding benefit for the respective subject.

24. The computer system of claim 1, wherein the expected availability of the compliance standard associated with the respective node for the respective subject is determined based on a period of time that encompasses a contiguous or intermittent present portion and a contiguous or intermittent future portion.

25. The computer system of claim 1, wherein the respective first message comprises an acknowledgement of consent by the respective subject for the automated human interface module to obtain and use personally identifiable information associated with the respective subject.

26. The computer system of claim 1, wherein the predetermined compliance question associated with the respective node comprises an explanation of the compliance standard associated with the respective node.

27. The computer system of claim 1, wherein the at least one program further comprises one or more instructions that, prior to receiving the message subsequent the respective first message:
  determines whether sufficient information has been received by the respective subject in the text-based conversation to determine that the respective subject is deemed to be eligible with the compliance standard associated with the respective node; and
  responsive to determining that sufficient information has not been received, engages the automated human interface module to prompt the respective subject to submit further information in accordance with another node in the plurality of nodes.

28. The computer system of claim 1, wherein the at least one program further comprises one or more instructions that, prior to receiving the second message:
  loads information regarding one or more prior text-based conversations with the respective subject in a respective communication channel in the plurality of communication channels; and
  uses the information regarding the one or more text-based conversations to progress in the node graph.

29. A non-transitory computer readable storage medium, wherein the non-transitory computer readable storage medium stores instructions, which when executed by a computer system, cause the computer system to perform a method of:

for each respective subject in a plurality of subjects, wherein the plurality of subjects comprises more than 100 subjects:

(A) receiving a respective first message, in electronic form, from the respective subject to engage in a respective text-based conversation through a respective communication channel in a plurality of communication channels, wherein the respective first message comprises a respective first application programming interface token that uniquely identifies the respective text-based conversation;

(B) responsive to the respective first message, engaging an automated human interface module with the respective subject through the text-based conversation in the respective communication channel, wherein:

the automated human interface module comprises a node graph comprising a plurality of nodes, each respective node in the plurality of nodes is connected to at least one other node in the plurality of nodes, each respective node in at least a first subset of the plurality of nodes is associated with at least one predetermined compliance question, and a second subset of the plurality of nodes corresponds to a plurality of distinct compliance standards, each distinct compliance standard of the plurality of distinct compliance standards having a corresponding benefit, each respective node in the second subset of the plurality of nodes is associated with a respective compliance standard in the plurality of distinct compliance standards, and the respective compliance standard comprising a corresponding plurality of requirements for compliance with the respective compliance standard;

(C) using a message received subsequent to the respective first message in the respective communication channel and responsive to the automated human interface module to progress the respective subject to another node in the node graph in accordance with satisfaction of the predetermined compliance question associated with a first node, wherein the first node is in the first subset of the plurality of nodes;

(D) repeating the using (C), when the respective subject remains in a node in the first subset of nodes, until the respective subject progresses to a respective node in the second subset of nodes, wherein the respective subject, through progression to the respective node in the second subset of nodes, is deemed to satisfy at least a subset of a plurality of requirements in the corresponding plurality of requirements of a compliance standard associated with the respective node in the second subset of nodes, wherein the subset of the plurality of requirements comprises at least a first requirement to receive the corresponding benefit from the compliance standard associated with the respective node in the second subset of nodes;

(E) generating, responsive to progression to the respective node in the second subset of nodes, a corresponding report comprising a result of an expected availability of the corresponding benefit for the respective subject in accordance with of the compliance standard associated with the respective node in the second subset of nodes and at least information provided by the respective subject in the text-based conversation in each instance of the using (C); and (F) communicating the corresponding report through the respective communication channel for review by the respective subject.

30. A method, comprising:

at a server system comprising one or more processors and memory:

for each respective subject in a plurality of subjects, wherein the plurality of subjects comprises more than 100 subjects:

receiving a respective first message, in electronic form, from the respective subject to engage in a respective text-based conversation through a respective communication channel in a plurality of communication channels, wherein the respective first message comprises a respective first application programming interface token that uniquely identifies the respective text-based conversation;

responsive to the respective first message, engaging an automated human interface module with the respective subject through the text-based conversation in the respective communication channel, wherein:

the automated human interface module comprises a node graph comprising a plurality of nodes, each respective node in the plurality of nodes is connected to at least one other node in the plurality of nodes, each respective node in at least a first subset of the plurality of nodes is associated with at least one predetermined compliance question, and a second subset of the plurality of nodes corresponds to a plurality of distinct compliance standards, each distinct compliance standard of the plurality of distinct compliance standards having a corresponding benefit, each respective node in the second subset of the plurality of nodes is associated with a respective compliance standard in the plurality of distinct compliance standards, and the respective compliance standard comprising a corresponding plurality of requirements for compliance with the respective compliance standard;

using a message received subsequent to the respective first message in the respective communication channel and responsive to the automated human interface module to progress the respective subject to another node in the node graph in accordance with satisfaction of the predetermined compliance question associated with a first node, wherein the first node is in the first subset of the plurality of nodes;

repeating the using the message, when the respective subject remains in a node in the first subset of nodes, until the respective subject progresses to a respective node in the second subset of nodes, wherein the respective subject, through progression to the respective node in the second subset of nodes, is deemed to satisfy at least a subset of a plurality of requirements in the corresponding plurality of requirements of a compliance standard associated with the respective node in the second subset of nodes, wherein the subset of the plurality of requirements comprises at least a first requirement to receive the corresponding benefit from the compliance standard associated with the respective node in the second subset of nodes;

generating, responsive to progression to the respective node in the second subset of nodes, a corresponding report comprising a result of an expected availability of the corresponding benefit for the respective subject in accordance with of the compliance standard associated with the respective node in the second subset of nodes and at least information provided by the respective subject in the text-based conversation in each instance of the using; and communicating the corresponding report through the respective communication channel for review by the respective subject.

\* \* \* \* \*